US010250337B1

(12) United States Patent
Tobias et al.

(10) Patent No.: US 10,250,337 B1
(45) Date of Patent: Apr. 2, 2019

(54) SYSTEM AND METHOD FOR PROVIDING UNDERWATER MEDIA CAPTURE

(71) Applicant: Wahoo Technologies, LLC, Fairfax Station, VA (US)

(72) Inventors: Kevin Craig Tobias, Fairfax Station, VA (US); Mark Gottlieb, Fairfax Station, VA (US); Karl Kenneth Lenz, Herndon, VA (US)

(73) Assignee: WAHOO TECHNOLOGIES, LLC, Fairfax Station, VA (US)

( * ) Notice: Subject to any disclaimer, the term of this patent is extended or adjusted under 35 U.S.C. 154(b) by 0 days.

(21) Appl. No.: 15/670,758

(22) Filed: Aug. 7, 2017

Related U.S. Application Data

(63) Continuation-in-part of application No. 14/921,711, filed on Oct. 23, 2015, now Pat. No. 9,729,253.
(Continued)

(51) Int. Cl.
H04B 13/02 (2006.01)
G03B 17/08 (2006.01)
(Continued)

(52) U.S. Cl.
CPC ............. H04B 13/02 (2013.01); G03B 17/08 (2013.01); H04N 5/23203 (2013.01);
(Continued)

(58) Field of Classification Search
CPC .... H04B 13/02; G03B 17/08; H04N 5/23203; H04N 7/185; H04W 4/027; H04W 84/12
See application file for complete search history.

(56) References Cited

U.S. PATENT DOCUMENTS 6,057,879 A 5/2000 Weber
6,091,443 A 7/2000 Ford et al.
(Continued)

FOREIGN PATENT DOCUMENTS

AU 2014256359 10/2014
CN 203105405 8/2013
(Continued)

OTHER PUBLICATIONS

P. Freitas, "Evaluation of Wi-Fi Underwater Networks in Freshwater," Master's thesis, Faculty of Engineering, University of Porto, available at http://win.inescporto,pt/, Jul. 15, 2014.
(Continued)

Primary Examiner — Zhihan Zhou

(57) ABSTRACT

Disclosed herein is a method including receiving, via a bridge system including a first adapter and a second adapter, a service set identifier and a password of a capture device and discovering the capture device via the first adapter and the second adapter of the bridge system. Based on a comparison of a first signal-to-noise ratio between the first adapter and the capture device with a second signal-to-noise ratio between the second adapter and the capture device, the method includes assigning one of the first adapter and the second adapter as a host adapter in the bridge system to communicate with the capture device, transmitting, from the host adapter, a signal to the capture device to prioritize a frequency band to use for communication with the bridge system, receiving, via the frequency band, IP packets from the capture device at the host adapter and forwarding the IP packets from the bridge system to a client device.

18 Claims, 21 Drawing Sheets

Related U.S. Application Data

(60) Provisional application No. 62/068,619, filed on Oct. 24, 2014.

(51) Int. Cl.
    H04N 5/232    (2006.01)
    H04W 4/02    (2018.01)
    H04N 7/18    (2006.01)
    H04W 84/12    (2009.01)

(52) U.S. Cl.
    CPC ............ *H04N 7/185* (2013.01); *H04W 4/027* (2013.01); *H04W 84/12* (2013.01)

(56) References Cited

U.S. PATENT DOCUMENTS

| | | | |
|---|---|---|---|
| 6,525,762 B1 | 2/2003 | Mileski et al. | |
| 8,120,650 B2 | 2/2012 | Laser | |
| 8,319,845 B2 | 11/2012 | Ortiz | |
| 8,437,630 B2 | 5/2013 | Wessner | |
| 8,654,189 B1* | 2/2014 | Spangler | H04N 7/183 348/81 |
| 2003/0235112 A1 | 12/2003 | Zimmerman et al. | |
| 2006/0234636 A1* | 10/2006 | Miller | H04L 29/12009 455/67.11 |
| 2008/0130579 A1* | 6/2008 | Kurita | H04W 8/18 370/331 |
| 2011/0055746 A1 | 3/2011 | Mantovani et al. | |
| 2011/0090330 A1 | 4/2011 | Luzi | |
| 2012/0047790 A1 | 3/2012 | Hess et al. | |
| 2012/0144723 A1 | 6/2012 | Davidson | |
| 2013/0086227 A1* | 4/2013 | Takao | H04L 67/00 709/219 |
| 2013/0239863 A1 | 9/2013 | Wiggins et al. | |
| 2014/0055611 A1* | 2/2014 | Wong | H04N 5/2251 348/143 |
| 2014/0212142 A1* | 7/2014 | Doniec | H04B 13/02 398/104 |
| 2014/0248058 A1* | 9/2014 | Simpson | H04B 10/112 398/104 |
| 2014/0269201 A1* | 9/2014 | Liu | H04B 11/00 367/131 |
| 2014/0340995 A1* | 11/2014 | Shimizu | H04B 13/02 367/131 |
| 2015/0055929 A1* | 2/2015 | Van Hoff | G11B 27/11 386/201 |
| 2015/0116496 A1* | 4/2015 | Ottaviano | H04N 7/185 348/148 |

FOREIGN PATENT DOCUMENTS

| | | |
|---|---|---|
| CN | 203233924 | 10/2013 |
| WO | WO 2013/186576 | 12/2013 |
| WO | WO 2014079164 | 5/2014 |

OTHER PUBLICATIONS

Mendez et al., "Deep Underwater Compatible Wi-Fi Antenna Development," *In IEEE 14th International Symposium on Wireless Personal Multimedia Communications (WPMC)*, 2011.

Le Pennec et al., "2.4 GHz Radio Transmission Measurements in a Basin filled with Sea Water," *OCOSS 2013: Conference on Ocean and Coastal Observation: Sensors and observing systems, numerical models and information systems*, 2013.

"SS Leatherback ROV". Apr. 18, 2013.

Wi-Fi vs. Water—GoPro Tip #80, http://www.youtube.com/watch?v=ap-_4C_10cY, published on Dec. 27, 2012.

How to make your GoPro WiFi working underwater, http://www.youtube.com/watch?v=49K2hjV9OOY, published Feb. 10, 2014.

Pedro de Freitas, Evaluation of Wi-Fi Underwater Networks in Freshwater, paginas.fe.up.pt/-ee10239/wordpress/wp-content/uploads/2014/03/thesis_pdi.pdf, U.Porto, Feb. 15, 2014.

GoPro Underwater WiFi—View by Eye of Mine Action Cameras, www.eyeofmineactioncameras.com/mobile/Product.aspx?ProductCode=EUWFV, 2 pages, retrieved on Oct. 30, 2015.

Paul, Illsley, GoPro Underwater Wi-Fi cable setup, http://paulillsley.com/GoPro_Underwater_Wi-Fi_Cable_Setup/index.html, retrieved on Oct. 30, 2015.

www.dvinfo.net/forum/under-water-over-land/513527-wifi-underwater.html, Re: WiFi underwater?, Jan Siimson, Feb. 16, 2014.

www.outdoorsmenformum.ca/showsthread.php?t=168539, Feb. 19, 2013.

https://plus.googleapis.com/photos/+ShaneDeCatania/albums/5970595904669283009, Jan. 19, 2014.

www.goprofanatics.com/general-gopro-discussion-news-and-announcements/838=wi-fi-underwater.html , WiFi Underwater, Jun. 15, 2012.

GoPro WiFi Underwater, www.youtube.com/watch?v=omTfxtEx20s, Jun. 18, 2012.

GoPro Hero3 + iPhone underwater wifi control, www.youtube.com/watch?v=XulEwbSgvQ0, published Mar. 24, 2013.

http://leatherback-rov.blogspot.com/, Rex Hill, 4 pages, Dec. 2012.

https://forum.openrov.com/t/tether-decision-tree/144, 2012-2013, retrieved on Oct. 30, 2015.

CamDo, GoPro Underwater Solutions, www.cam-do.com/GoProUnderwaterSolutions.html, retrieved on Oct. 30, 2015.

www.eyeofmineactioncameras.com/Underwater_Live_Video_by_Eye_Of_Mine_s/1879.html, Accessories Section, retrieved on Oct. 30, 2015.

www.youtube.com/watch?v=LueUP1xwX7w, FishPhone by Vexilar—Underwater Camera Mobile App, pubished on Dec. 16, 2013.

Goprouser.freeforums.org/gopro-hero-2-wifi-bacpac-extension-cable-wich-pins-t13195.html, Jun. 2013.

Aqua-Vu Underwater Cemeras Go Mobile and Wireless | Walleye Fishing, Jul. 6, 2013, Crosslake, MN. http://walleye.outdoorsfirst.com/articles/07.07.2013/5929/Auq-Vu.Underwater.Cameras.Go.Mobile.and.Wireless/, 2 pages.

Wireless fishing elecgtronics: A look at the brave new world of on-the-water Wi-Fi, by Dan Johnson, Contributing Writer, posted Mar. 3, 2014.

www.youtube.com/watch?v=OGGAaY8wG0k, Carplounge Funk Kamera wireless underwater Cam for Baitboat in action, published on Jan. 1, 2014, 5 pages.

Rapala, Pancam Camera System, www.rapala.com/marcum/underwater-fishing-cameras/wifi-camera-systems.pancam-camera-system/MPC01.html, retrieved on Oct. 30, 2015.

http://www.fishsens.com/fishsens-sondecam-hd-underwater-camera.html, SondeCAM HD Underwater Camera, retrieved on Oct. 30, 2015.

\* cited by examiner

SYSTEM AND METHOD FOR PROVIDING UNDERWATER MEDIA CAPTURE

PRIORITY CLAIM

This Continuation-in-part application claims priority to U.S. application Ser. No. 14/921,711, filed Oct. 23, 2015, which claims priority to U.S. Provisional Application 62/068,619, filed 24 Oct. 2014, the contents of which are herein incorporated by reference in their entirety.

BACKGROUND

1. Technical Field

The present disclosure relates to underwater video and more specifically to systems and methods of communicating underwater video, images or other data from a media capture device to a device above the surface of the water.

2. Introduction

Action cameras have become an integral part of photography and videography in the past decade. In particular, the invention of the GoPro® camera has changed the industry standard for what an action camera should be capable of.

The GoPro® camera became popular because it is compact, lightweight, rugged, wearable, mountable, waterproof and controllable by the user. These features allow the user to capture and display images from the user's point of view or desired vantage point. One of the most recent developments in action cameras has been the addition of Wi-Fi radios, which give the camera the ability to connect wirelessly to other Wi-Fi-enabled devices (e.g., smart phones, tablets, computers, etc.). The Institute of Electrical and Electronics Engineers (IEEE) has designated the wireless technology involved with the use of this 2.4 GHz and 5.8 GHz Ultra High Frequency (UHF) band as the standard known as 802.11. With the addition of Wi-Fi capability to action cameras, the user now has the ability to stream and control the camera remotely. While the camera may be mounted or located in another area or point that is out of reach, the user can still view the images from and control the camera from another Wi-Fi-enabled device with a display. The control feature has become the method by which many users will capture that once-in-a-lifetime video or snap that breathtaking picture, all without the user having to be right where the camera is or being physically tied to the camera with hardware. This breakthrough led to questions about how far users could take this wireless functionality of an action camera. In many aquatic hobbies (e.g., fishing, scuba diving, etc.), the community began to ask if this wireless connection could be used to bring streaming video data to the surface. In simpler terms, the question is whether the user above water can see what the camera sees below water in real time and wirelessly. In short, the answer with present technology has been no. The UHF Wi-Fi signal transmits very poorly through water, reducing what is normally a few hundred feet of range in an air environment to a mere few inches through water.

SUMMARY

The system disclosed herein addresses the problem of how to get the wireless UHF signals from an underwater video camera or other capture device to the surface for viewing. This problem is that for many fishermen, scuba enthusiasts and other aquatic activity hobbyist, they would like to monitor what is going on under the water in real time by using any camera with Wi-Fi and any personal smart device such as a tablet, smart phone or other Wi-Fi-enabled displays. The present disclosure introduces new technologies to make this desire a reality. By putting a wireless interface module in close vicinity to any Wi-Fi-enabled action camera, the user can quickly connect completely wirelessly to their camera that is underwater and stream the picture in real time to the surface where it can be viewed in a variety of ways, through a variety of products and even through a custom application designed for this purpose.

An example system according to an aspect of this disclosure includes an underwater wireless interface module (client network) and receives a first wireless signal from a media capture device capturing underwater images to yield a first signal. An above-water wireless interface module (host network) is connected to the underwater wireless interface module via a wired tether. The above-water wireless interface module receives the first signal and transmits via an antenna the first signal to yield a second wireless signal. A mobile device can receive the second wireless signal and display the underwater images. The signal can also be communicated via a wire to navigation or other equipment for viewing. The main components that make the communication possible are the host network and the client network disclosed herein. No changes need to be made to the camera or the mobile device.

In another aspect, the system can include an underwater housing having an underwater wireless interface module communicating with a media capture device and an above-water wireless interface module configured in a floating, above-water housing, the underwater wireless interface module communicating with the above-water wireless interface module via a tether. A tether extension and retraction device is used and it may extend and retract the tether.

When a wireless communication system is placed in a body of water and when a weight of the underwater housing causes the underwater housing to sink in the body of water, the underwater housing is separated from the floating above-water housing via the tether extension and retraction device to yield an extended system. The underwater wireless interface module in the extended system receives a first wireless signal from the media capture device capturing underwater images to yield a first signal. The underwater wireless interface module in the extended system transmits the first signal via the tether to the above-water wireless interface module. Finally, the above-water wireless interface module in the extended system transmits the first signal to yield a second wireless signal, wherein a mobile device can receive the second wireless signal and display the underwater images captured from the media capture device.

The disclosure also includes several method examples, in a first aspect, a method includes receiving, via an underwater wireless interface module, a first wireless signal from a media capture device capturing underwater images to yield a first signal and transmitting the first signal through a wired tether to an above-water wireless interface module. Finally, the method includes transmitting the first signal from the above-water wireless interface to yield a second wireless signal, wherein a mobile device can receive the second wireless signal and display the underwater images.

In another aspect, a method of operating a wireless communication system is disclosed. The wireless communication system includes several components including (1) an underwater housing that holds the camera, having an underwater wireless interface module communicating with a media capture device and (2) an above-water wireless interface module configured in a floating above-water housing, the underwater wireless interface module communicating with the above-water wireless interface module via a tether. In this aspect, the method includes, when a wireless communication system is placed in a body of water and when a weight of the underwater housing causes the underwater housing to sink in the body of water, performing the steps of: (1) separating the underwater housing from the floating above-water housing via a tether extension system; (2) receiving, via the underwater wireless interface module, a first wireless signal from the media capture device capturing underwater images to yield a first signal; (3) transmitting the first signal through the tether to an above-water wireless interface module; and (4) transmitting the first signal from the above-water wireless interface to yield a second wireless signal, wherein a mobile device can receive the second wireless signal and display the underwater images.

Another aspect of this disclosure relates to the calibration process of how the bridge system, which includes a first adapter and the second adapter, will be calibrated to establish the proper configuration environment to bridge a media capture device, and the client device such that IP packets can be communicated therebetween. An example method includes receiving, via a bridge system including a first adapter and a second adapter, a service set identifier and a password of a capture device and discovering the capture device via the first adapter and the second adapter of the bridge system. Based on a comparison of a first signal-to-noise ratio between the first adapter and the capture device with a second signal-to-noise ratio between the second adapter and the capture device, the method includes assigning one of the first adapter and the second adapter as a host adapter in the bridge system to communicate with the capture device, transmitting, from the host adapter, a signal to the capture device to prioritize a frequency band to use for communication with the bridge system, receiving, via the frequency band, IP packets from the capture device at the host adapter and forwarding the IP packets from the bridge system to a client device.

DETAILED DESCRIPTION

A system, method and computer-readable storage devices are disclosed which relate to several different aspects of how to communicate a wireless signal from a media capture device transmitting under water. In one aspect, an above water wireless module is secured to a boat which via a tether, receives signals from an underwater wireless module. In another aspect, an above-water wireless module is contained within an independent and floating housing separate from a larger boat.

Various example systems of the disclosure are described in detail below. While specific implementations are described, it should be understood that this is done for illustration purposes only. Other components and configurations may be used without parting from the spirit and scope of the disclosure. Moreover, it should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to one or more other examples. Precisely, one of ordinary skill in the art will readily recognize that the various embodiments or examples described herein, and their associated features, can be combined with each other.

The present disclosure addresses the problem set forth above about the need for a system to be able to, in real time, via underwater video. A system, method and computer-readable storage devices are disclosed which address this problem.

Figure 1:
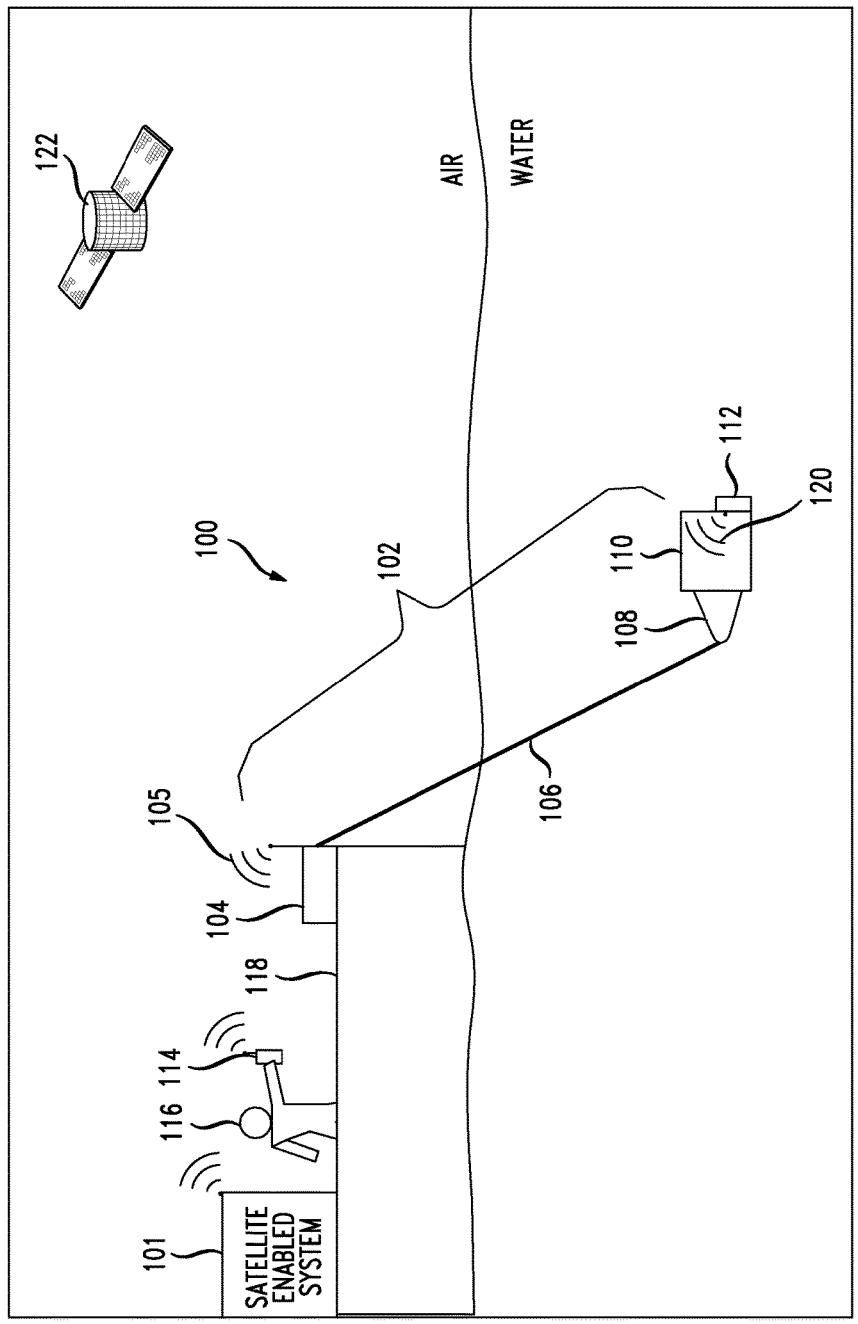
FIG. 1 illustrates an example system in the context of its use.

FIG. 1 illustrates an aspect of this disclosure that solves the connectivity issues for getting a Wi-Fi signal from underwater to the surface where it can be easily viewed above water. The system 100 includes a number of components 102.

Details of the technology will be next introduced. As shown in FIG. 1, the present disclosure focuses on connecting a Wi-Fi-enabled smart device 114 (e.g., smartphone, tablet, wearable), which is in the air medium, to a Wi-Fi-enabled camera 112 (e.g., Gopro®, Ion® Contour, Sony® Actioncam, or other such cameras, some yet to be designed and built), which is in the water or other liquid medium. Of course any wireless communication protocol can be used. A successful connection requires a system 102 of hardware with two wireless adapters 104, 108. One adapter 108 wirelessly communicates through water or other liquid with a camera 112 and one adapter 104 wirelessly communicates through air with another device 114. Bridging of Wi-Fi signals programmatically is a challenge that is solved using the hardware disclosed herein.

The above-water adapter 104 is the "host" network and underwater adapter 108 is the "client" network. The software that sits on the system 102 is used to connect wireless signals on the client side 108 and on the host side 104. The system mirrors the network from the client side 108 onto the host side 104 and vice versa. The complicated part solved by the disclosure herein is being able to seamlessly pass packets between the two adapters as if they were really one network.

This section will explain the usefulness of the concepts disclosed herein and the advantages of using the disclosed wireless system, as opposed to other anticipated wired solutions. The disclosure will also list variations of implementations that would be advantageous for particular user.

Having cables all over one's boat or other floating vessel is neither efficient nor ideal. Also, having the ability to avoid any cable returning to the boat is another advantage. Providing wireless communications for underwater streaming video has many uses that will lead to further innovation.

Other details disclosed in FIG. 1 will be discussed next. A boat 118 includes a first component that is the host device or a wireless surface module 104 having an antenna such as a Wi-Fi antenna. The boat 118 can also be a smaller vessel or a simple floatation device such as a buoy. The wireless surface module 104 communicates via a tether 106 with the client device or an underwater wireless interface module 108. The underwater wireless interface module 108 is configured within an underwater housing 110 that includes several components, such as a media capture device 112, which shall be discussed more fully below. The basic operation of the system 102 is that the media capture device 112 takes video underwater. The media capture device 112 then communicates wirelessly a signal 120 to the underwater wireless interface module 108. The signal is communicated via a wired tether 106 to an above-water wireless interface 104. The above-water wireless interface 104 receives the wired signal from the tether and transmits a wireless signal 105 that can be received via a user device 114 such as an iPad® or other mobile device or even marine electronics system, such as a navigation system with a monitor. In this manner, a user 116 on the boat 118 can, in real time, view the images captured by the underwater media capture device 112.

Alternately, the user device 114 can also communicate the real-time images or video to another device wirelessly such as a base station or satellite 122. Note that in order for the data to be streamed to a satellite 122 or cell tower, it will need the appropriate antennas. For instance, while there are many marine electronics that can receive video over Wi-Fi using this system, it would require satellite enabled hardware 101 and the appropriate satellite antenna system to then stream the data over satellite 122. In this manner, the media from the device 112 can be communicated to the Internet and can be streamed live through a network, such as the Internet, to other viewing devices. Feature 101 can also represent other hardware for any other wireless communication protocol.

Note that as with many electronic devices, the basic components are included. For example, memory, processors, a system bus, RAM, ROM, hard drives, input and output interfaces, displays, keypad, touch-sensitive surfaces, gesture recognition and processing, speech processing, and all their variations are considered as within the scope of this disclosure. Non-transitory computer readable storage media or devices, which do not encompass signals per se, are included within the various components disclosed. Such computer readable storage media or devices store instructions which, when executed by a processor or a computing device, perform operations as disclosed herein. Thus, all the basic hardware components are included within the scope of this disclosure, whether specifically mentioned or not, as would be understood by one of skill in the art.

Note that today Wi-Fi is the industry standard for such video communication, but that the concepts disclosed herein could work with a multitude of other wireless video communication standards/technologies and some yet to be on the market. And for the purpose of the disclosure, where the term Wi-Fi might be used, any other communication protocols/technologies can be used as well.

The system 102 takes advantage of the fact that although Wi-Fi is known for all practical purposes not be able to transmit over any significant distance underwater, experience has shown that it will transmit through very short distances of a few inches and still maintain signal integrity with acceptable signal-to-noise ratios (SNRs), power levels and the signal characteristics required to then provide the data needed for displaying that video image above water. Essentially, by connecting the 1) underwater wireless interface module 108 to the back (or in any configuration that is in close proximity) of any waterproof camera 112 with Wi-Fi capability or by placing the module within a few inches of the camera 112, the module will wirelessly acquire the streaming signal from the camera 112 within the waterproof camera enclosure or straight from the camera if it is a wireless camera without a case and carry that signal (or a representation of that signal) to the surface via a communications tether 106. For example, the module can be within 3 inches of the camera. The range can be 0 inches to 20 inches and any specific number in between. Ideally, the transceiver 108 is as close is as possible to the media capture device 112 for a best wireless connection and the best signal-to-noise ratio. This tether could be a variety of cables systems, and would probably (but not necessarily) be a cable system which is waterproof containing power, ground, data in and data out wires. The tether 106 may consist of a wire made of copper or other conductive material encased in a protective sheath. The tether 106 will then connect to the surface module 105 having Wi-Fi (other protocol) antenna system. The system 102 or components of the system can use any sort of operating system. Example systems can be Linux® or other operating systems.

The surface module 104 with Wi-Fi antenna is located above the surface. The surface module 104, which is the host network, receives the signal that was acquired from the underwater wireless interface module 108 next to the camera 112 and then translates (if necessary) the signal into the proper format and transmits the signal (through one of many methods) from the underwater wireless interface module 108, which is the client network located in close proximity to the camera 112. This converts the signal into a standard Wi-Fi signal that will be broadcast through the air and made available to any user or users within range (a few hundred feet or more with optional signal extenders) with a Wi-Fi-enabled device 114. The data handling from the incoming signal through the communication tether 106 happens at the surface micro-computer included in the above-water adapter 104. This is accomplished by running scripts such as C++ scripts (or other such methods) that automatically initialize the micro-computer 104 to expect an incoming signal from a client network, in this case, the camera's wireless network. Once retransmitted from the antenna above water, the signal/host network is available to any Wi-Fi-enabled devices within range such as the device 114. Typically, the surface module 104 would be mounted on a boat 118, dock or structure above water to make the signal available to those above the surface with Wi-Fi enabled devices but could also float on top the water or even be on a dirigible.

Figure 2:
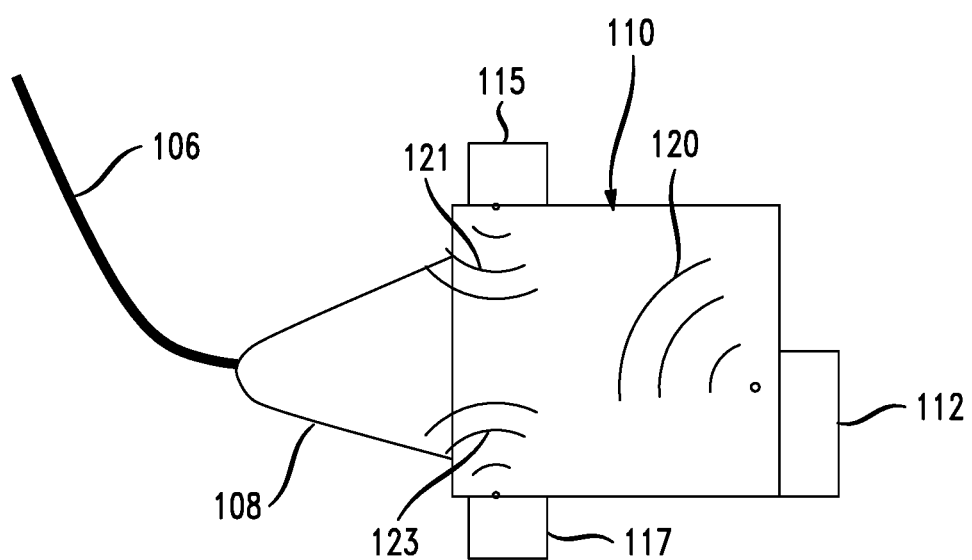
FIG. 2 illustrates an underwater housing with various modules.

FIG. 2 illustrates more details about the underwater housing 110 and underwater wireless interface module 108. The housing 110 could be any shape for some applications, but would preferably be part of a hydrodynamic or conical form factor for trolling behind a moving boat. It may or may not be watertight. In the case of the hydrodynamic version for trolling behind a moving boat, the pointed end of the housing 110 is where the tether 106 connects to the module 108 via a bulkhead connector. On the other end of the housing 110 is where the housing 110 will interface (either physically or in close proximity) with the backplane of a waterproof enclosure of a camera 112 as the user chooses. The connection 120 can be made in a variety of standard methods to the user's camera housing of choice (mechanical, suction, adhesive, tape, magnetic, Velcro, straps, etc.). The adapter (not shown) that is adhered to the cameras enclosure, is part of, or mates with the adapter head that is on the truncated plane of the module. Alternatively, the wireless interface module 108 can be a few inches away from the camera 112 that is acquiring video, but again the ideal proximity of the camera and the module are keeping them as close as possible. Inside the housing 110 is the underwater wireless interface module 108 having a custom circuit, which has a communication link such as Universal Serial Bus (USB) 2.0 circuit (or other), where the Wi-Fi signal (after some processing) is routed over the tethered cable 106 to the surface module (not shown). The underwater inference module is also designed with RF receiver sensitivity, gain and antenna methods such as parabolic form factor, grid or mesh surface, and conductive-free shell to ensure minimal attenuation and maximal packet capture without having duplicates from refraction and reflections.

The system could also be configured for a vertical drop type system. In this case, the transceiver 108 in FIG. 2 could be configured on top of the housing 110. The drop system is useful for inspecting the bottom of the sea floor, the bottom of your own boat, treasure hunting or for viewing a wreck. The drop system would be of particular usefulness in the growing 360-degree camera market. There is a growing market for such a system and it could be used for scuba and the scientific community alike. The drop system could be configured as follows. At a bottom portion could be a 360-degree camera mount or any other kind of media capture device mount. Above the camera mount could be a transceiver 108 which is positioned sufficiently close to the camera to receive a strong wireless signal. Around or above the position of the transceiver 108 could be a positioning control system with propellers and/or controllable motors for providing movement of the entire underwater unit. Any kind of propulsion system could work. The propulsion system can be part of the underwater housing 110 or could be part of an above water floating system 124. The propulsion could be part of both systems as well. A tether 107 could include a cable and a control line for communicating data back and forth. Control signals can be communicated from the device 114 which can have an application to controlling features such as at least one of a direction, a movement, a depth, lighting, any sensor input, and so forth, of the underwater unit 108/110/112. A host system can include the above-water module 126 and a floating device 124. The above water system can include a battery for powering the system. The underwater component could also include a batter for powering the system and a power line could be fed between the above water components and the underwater components. The application on the device 114 can be configured such that depending on the direction the user is facing with the device 114, the portion of the 360-degree camera angle that the direction corresponds to is shown on the device 114. With the image data from under the water and the ability to control the movement of the drop-down system, the user could do a complete inspection of underneath their boat without needing to dive on the boat.

Of course the drop down system does not require a 360-degree camera but could use any standard media capture device. The application running on the user device 114 can include programming to enable graffiti or gesture input (or any other type of input) to control at least one of the direction, depth, speed, lighting, sensor input, and so forth to enable the person on the boat 118 to be able to get a proper view of the underside of the boat. Furthermore, the application could have a "home" feature in which a sensor or device could be secured to a position on the boat, such as by a swim platform, that when the viewing of the underside of the boat is complete, the system moves towards that position so that the user can retrieve the system from the water. The home feature could simply move the system towards the physical location of the device 114 such that the user simply needs to go wherever on the boat it is convenient to retrieve the system (such as at a swim platform) and the propulsion system brings the system to that location. The system could include a structure such as a loop positioned on the above-water portion 124 which the user could reach a hook out and easily grab the system for retrieval.

In another aspect, the system can include multi-camera and multiple-displays simultaneously. A distinguishable quality of using wireless in this solution is that without a single video out cable, like High-Definition Multimedia Interface (HDMI), the user may achieve network-ability and the ability to connect to multiple cameras to one display, thus giving the user more flexibility from one place on the boat. Users may want more than one camera in the system at a time. For example, a fishing boat may have two fishermen each with their own GoPro®. The users may want a front-facing camera and back-facing camera or camera that faces down, etc. It is also important to recognize the world of accessories continues to grow relating to remotely viewing from Wi-Fi remote displays from third-party providers. These can all be taken advantage of because of the wireless connection being made. These devices will see the incoming networks and treat them just the same as they normally would above water because of the mirroring of the system. They will appear no differently. This makes the system not only useful but more efficient. This unlocks a whole new world that has previously been untouched. Thus, as is shown in FIG. 2, a top camera 115 could be positioned which could face backwards, upwards, forward, or any direction and transmit its signal 121 to the transceiver 108. Another camera 117 could be positioned on the bottom of the housing 110 and face any direction and transmit its signal 123 to the transceiver 108. The housing could have camera mounting points at any location.

Figure 3:
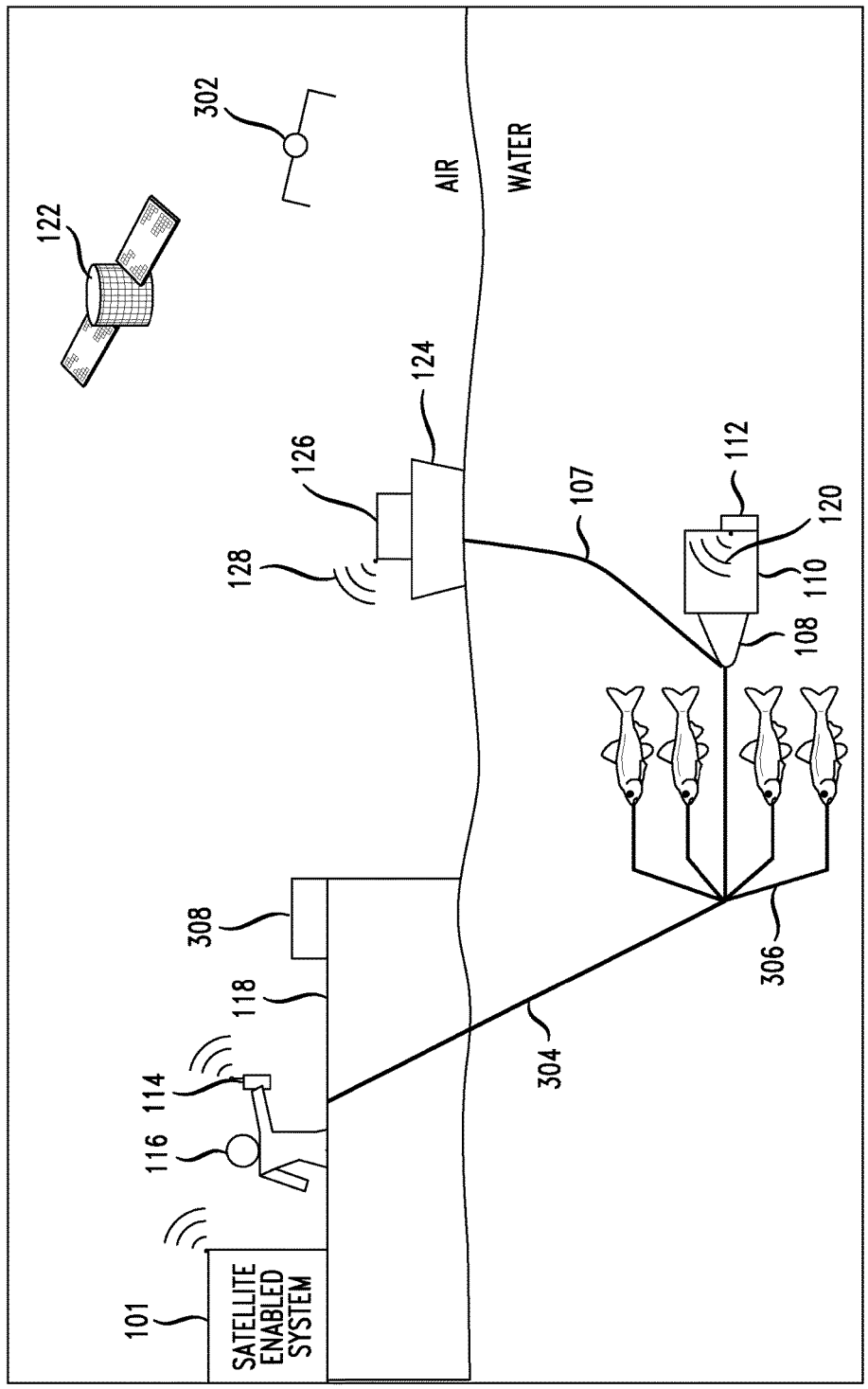
FIG. 3 illustrates an aspect where a wireless module floats on the surface of the water.

It is noted that the configuration shown in FIG. 2 can adjust depending on the aspect of the system. In other words, if the above-water wireless module 104 is configured to be on the boat, then the housing configuration 110 will likely look more like what is shown in FIG. 2. If the above-water wireless module is positioned more above the housing 110 in a floating device 124 as is shown in FIG. 3, then there can be two tethers attached to the housing 110. One tether 304 would not necessarily carry the data captured from the camera 112. Tether 304 would attach to the boat and merely be used to pull the housing 110 through the water. In one scenario, the housing 110 represents a dredge system or other underwater structure that is pulled through the water. The housing could also be attached to a dredge 306 and pulled along with it. The underwater module 108 could be attached to the dredge 306 in such a scenario. In that case, the cable 304 is the dredge cable that is used to pull the dredge 306 through the water.

Another tether 107 can be configured more on top of the housing to feed the data from the module 108 up to the above-water wireless module 126 configured in a floating device 124 for transmission wirelessly to the device 114 on the boat 118. The device 114 can also retransmit the data to a remote device 122 such as a satellite, a cellular base station, or a device on another boat or on shore. The above-water device 126 could also transmit the signal to a device 308 on the boat that could be a re-transmitter which would retransmit the signal so that devices 114 on the boat can receive a strong signal. The device 308 could also communicate the signal wirelessly or wired to another device which provides the satellite 122 or base station connection. In this manner, the images/video can be streamed over a network and viewable from other locations on land or on another boat. Note that power could be provided from the boat 118 at a connection point through the tether 304 to underwater module 108 and even to the camera 112 under the proper configuration. Power could also be provided up tether 107 to the above-water wireless module 126. A solar-powered approach could also apply where a solar panel (not shown) could be configured on the floating device 124 for powering the above-water wireless module 126. The above-water wireless module 126 may have its own external power source such as a battery housed inside the floating device 124.

The communication from the underwater wireless interface module 108 to the surface module 104, 126 could be a one-way communication link, but in many applications it could very well be a two-way communication link as well. The two-way link makes additional functionalities available to the system. For instance, the system through video methods or sensors can be programmed to automatically adjust its position or send out other instructions to connected hardware because of data received—all without user intervention. An example would be through image processing, the unit changing its position in response to spotting a fish in the camera's view. In another example, the housing can have mechanisms for steering the housing through a rudder system. An application can be configured on a mobile device 114 on the boat 118 that enables the user to manually steer the housing 110. This can enable the entire system to have more mobility within the water to view what the user 116 desires to view. The housing can also have its own miniature propeller system which can give the user 116 even more control of its movement and positioning.

In another aspect, the camera 112 can be attached to a controllable moveable member such that the camera 112 can be controlled by the device 114 to move up, down, right or left. In this regard, again, the user can have more control by having control signals transmitted from the device 114, to the above-water module 104, 126 and transmitted down the tether 106, 107 to the underwater module 108. The underwater module 108 can, via wired or wireless communication, cause control mechanisms to make the appropriate adjustments as are described herein. Of course, depending on the device 112, other camera adjustments such as zooming, focusing, picture taking, etc. can be made for the image capture device 112.

The tether 106, 107 at the basic level brings a data in and data out wire. It also can have additional wires for power to be transmitted over the tether 106, 107 for purposes of powering and controlling the electronic interface module 108 or charging the camera's battery as an additional feature. Note that instead of additional wires for power, the tether 106, 107 could use technology commonly used for "power-over-wire" approaches. The camera could then be powered wirelessly or through other such methods like battery reduction, which replaces the typical battery with an adapter to bring power wires straight to the battery contacts.

The underwater wireless interface module 108 has circuitry that is used to make the module smart. The circuit can contain many other sensors such as a 3-axis gyroscope circuit which can acquire the position (angles) of the module as it moves through the water. The circuit could interface with a small electric motor that controls stabilizing fins on the outside of the housing 110 based on the position provided by the gyroscope. This means that the module can stabilize itself to look straight forward or to look down or up based upon the user's input via Wi-Fi signal from above using the app on the device 114. This is all controlled by the user 116 as she monitors from her wireless device 114 on the surface via a custom application.

Other sensors within the housing 110 could include a salinity sensor or pressure transducer to provide depth indication. This depth indication is useful for changing the position of the module 108 in the water column via the stabilization fins. These could be used to dive or rise to a specified depth set/controlled by the user 116 without the boat 118 having to change speed. Accordingly, trolling speeds or boat maneuvering is not a factor impacting fishing. The ability of the housing 110 to be able to change depths and positions both manually and autonomously is extremely useful for anglers, so that they can explore the water column where they previously could not without impacting their trolling techniques as well as boat speed.

The system disclosed herein can also have the ability to control the height of the camera system 112 above the sea floor by taking advantage of the depth sounding to know where the sea floor is relative to the camera. A sensor built into (or connected to) the housing 110 of the underwater wireless control system could determine its height above the sea floor. Or, the sea floor information could come from the boat's depth sounder equipment and be fed to the underwater wireless control module 108 via the system's two-way data communication protocol. This would allow one to program the underwater wireless interface module 108 to make itself (and the camera 112) remain at a set height above the sea floor as the boat 118 moves. This approach could also be useful for observing the sea floor for lost or other interesting objects.

The underwater wireless interface module 108 can also contain (or control external) LEDs for adding light for the camera 112 when it is in dark areas such as a shipwreck or with murky waters. These lights could also be activated in a flashing fashion to simulate reflections of bait fish to attract bigger fish. The light could initially be the camera light which can be controlled to turn on or flash. Alternately, an aft portion of the housing 110 can be configured with lights which also can be controlled by the system 102.

The underwater wireless interface module 108 can also have inputs for (or contain) a thermocouple that is in contact with the water to measure the water temperature. This is useful for identifying potential thermoclines and noting or relating that to where the fish are active.

Presence recognition (using the camera itself) can be used with the system to be able to identify the presence of an object (e.g., big fish) and eventually could actually identify particular details about the object. This presence recognition could be used to set off an alarm that would alert the user 116 that something may be present in the general viewing area. This helps the captain or angler to pay attention to other important factors of running a boat—yet gives notice when a fish comes into view. Once the camera 112 identifies an object such as a large fish, and the system has data identifying the fish, an automated system could cause the camera to track that fish, zoom in, rotate, etc. to keep that particular object within the view frame at a chosen size.

Additional actions that the system could take include: dive to where the object is; deploy vibrations, scents or variations of lighting to attract or change fish behavior. These functions and measurements are acquired by the system and made available to the users at the surface with their Wi-Fi enabled devices 114 via the Wi-Fi network interface established by the surface module 104, 126 with a Wi-Fi interface.

The underwater interface module or housing 110 can also have (or be connected with) fluid turbines to use the moving water and translate that energy of moving fluid into electrical energy, which could be used to power the underwater wireless interface module 108 or other components such as above water module 104, 126 (and even the camera 112 or other components). This module could be used independently with a camera, with an existing camera housing used for trolling or other applications like trolling motors, wreck cameras, treasure hunting, etc.

The communications tether 106, 107 may include cabling to allow the transfer of the data from the underwater wireless interface module 108 to the surface module 104,126 having a Wi-Fi antenna. Typically, it would consist of a waterproof tether with a non-twist cable with electromagnetic interference (EMI) shielding and a waterproof locking connector for the end of the cable that interfaces with the underwater interface module 108. The other end of the cable 106, 107 pigtails to an interface with the surface module 104, 126. The cable 106, 107 could have data in and data out, power leads for providing power wirelessly and could have other digital input and output (I/O). As mentioned earlier, power to the electronic interface module could even be through techniques such as "power-over-wire" or "power-over-Ethernet (POE)".

Drones use protocols such as Wi-Fi on various frequencies to stream video wirelessly. With a dredge application of the disclosed principles, one could use positional sensors to have the drone follow the dredge, thus granting both aerial and underwater view all at the same time from the same screen. In this regard, technologies exist that enable a user to place a sensor on their clothes and have a drone with a signal linked to the sensor follow the user. For example, a skier might attach the sensor to her clothing and the drone can follow her down the mountain. Applying that technology to the present disclosure, the dredge and/or the water module 126/124 can include such a sensor that a drone 302 would link to and follow.

Other applications besides fishing can include dredge projects, wrecking projects, drone and trolling motor applications, as well as treasure hunting and archeology. The technology disclosed herein is of particular interest to the sport fishing community because it allows for the unit to also be tied into dredges and other "teaser" type of systems. In this respect, feature 110 can represent any such dredge or teaser system used in fishing. Feature 110 can represent a drop down system with 360-degree cameras attached.

One example structure for the drop down system could be one that includes the floating device 124 connected to the housing 110 via the tether 107 but that is not connected to the boat 118 via line 304. For example, assume a sailor needs to see if a line is caught up in the boat propeller. A system could include a package that could be tossed into the water on the side of the boat. The floating mechanism 124 provides an above-water housing for the host adapter 126. The housing 110 with the client module 108 sinks down into the water (e.g., 10 ft.). The tether 107 extends to enable the communication as disclosed herein. One of the housing 124 and/or the housing 110 can include a propeller or propulsion mechanism. The propulsion system can be represented as feature 402 of FIG. 4. Using the two-way control between the device 114 and the underwater module 108 in communication with a propulsion system, the user 116 could, via an application on the device 114, control the depth, position and camera angle, etc. of the underwater camera 112 and be able to view any position or location underneath the boat 118. The safety advantage of such a system is that it does not require the sailor to dive on the boat to identify issues. The housing could even be configured to be something like a hand-held device that a diver would hold or a helmet that a diver would wear.

The advantage of the dredge configuration in sport fishing is the lack of a signaling cable returning to the boat. Rather, the camera or camera housing can be attached to a dredge system 110 and the tether 107 can exit the housing 110 straight to the surface to a floating transceiver 126 as shown in FIG. 3. Dredges 306 typically are pulled behind sport fishing vessels as an imitation to attract or raise fish in the water column to the surface where hooked baits are. The dredge is pulled by a heavy monofilament or cable 106, 304. The technology disclosed herein can also be used with the communications being integrated in with the cable/line 106, 304 pulling the dredge 110. For a simplistic, streamlined and least intrusive approach, the dredge application with floating transceiver 126 offers a solution for getting wireless video feed back to the boat 118, without having a tether 107 returning to the boat 118.

Most sport fishing vessels 118 have what is called a bridge or elevated deck for a better view into the water, for spotting fish. Still, with water reflections, sun glare, and so forth, it is often hard to see when fish are approaching. Also, some boats do not have towers, like, for example, center consoles boats. The technology disclosed herein provides added functionality to all boats and enables users with wireless devices the ability to view the underwater activity from anywhere on the boat and in real-time. Such a capability allows for viewing pleasure and faster reaction times for seeing fish.

Another significant feature would be live streaming applications that are used for streaming video or images to the Internet. This can enable viewing from anywhere in the world. Currently, companies such as GoPro and Sony allow for streaming from camera to the smart device and then over Long-Term Evolution (LTE) connection, for example. The system 102 disclosed herein could also be used to stream data to a satellite 122 for tournaments or in the scientific world for worldwide collaboration. Treasure hunters or archeologists could also live stream their finds. Other events that people may want to be shared in real time around the world can use this system.

Figure 4A:
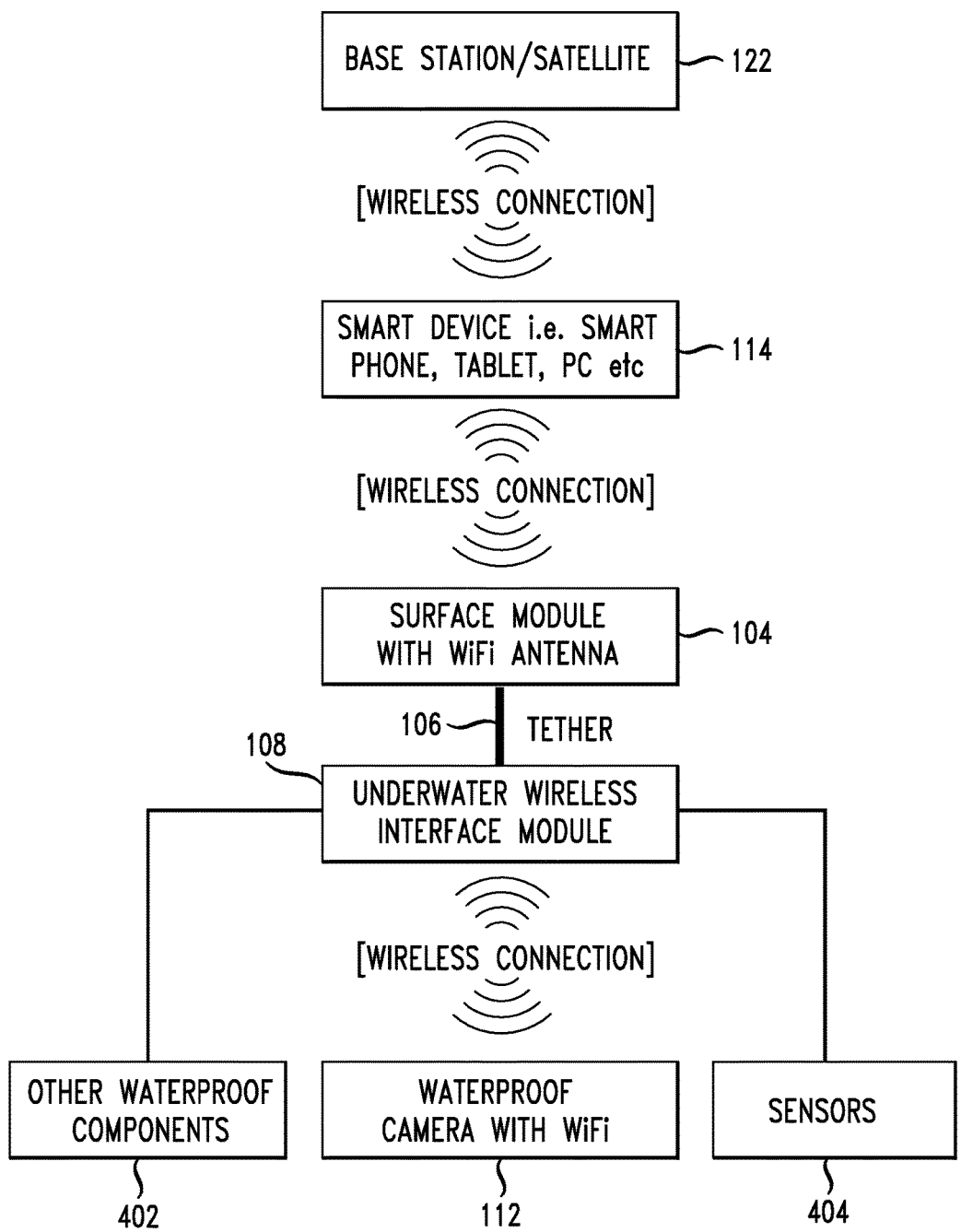
FIG. 4A illustrates the basic system components and how they communicate.

FIG. 4A discloses the basic components and communication between them. Feature 112 is the waterproof camera that has Wi-Fi (or other wireless protocol) capability. Waterproofing may be optional or achieved by using a separate waterproof housing for the camera. The camera communicates images/video/audio through wireless connection underwater to the underwater wireless interface module 108. The module 108 communicates the data through a wired tether 106 to the surface module with a Wi-Fi antenna 104. The surface module 104 transmits the signal through a wireless connection to a device 114 on a boat 118. The connection also can be two-way in which the device 114 can have an application that enables signals to be sent for controlling the camera 112 as well as other components such as a rudder, propeller, motion of the camera 112, rotational control, depth control, etc. 402. Feature 404 represents any kind of sensor that may be built into the system such as a depth sensor, temperature sensor, light sensor, speed sensor, motion detection sensor, etc. These can be configured in any location on the housing 110 or elsewhere. An aspect of this disclosure includes automatic control of the media device 112 through data or instructions sent via the wired tether 106 to the underwater wireless module 108. Sensor 404 data can be transmitted through the tether 106 to the module 104, processed, and instructions transmitted back to control parameters (direction, position, speed, quality, etc) associated with the camera 112 and/or other components 402. For example, if a low light condition is sensed via the sensors 404, the system can automatically change camera characteristics while turning on a light 402 position on the housing 110.

Figure 4B:
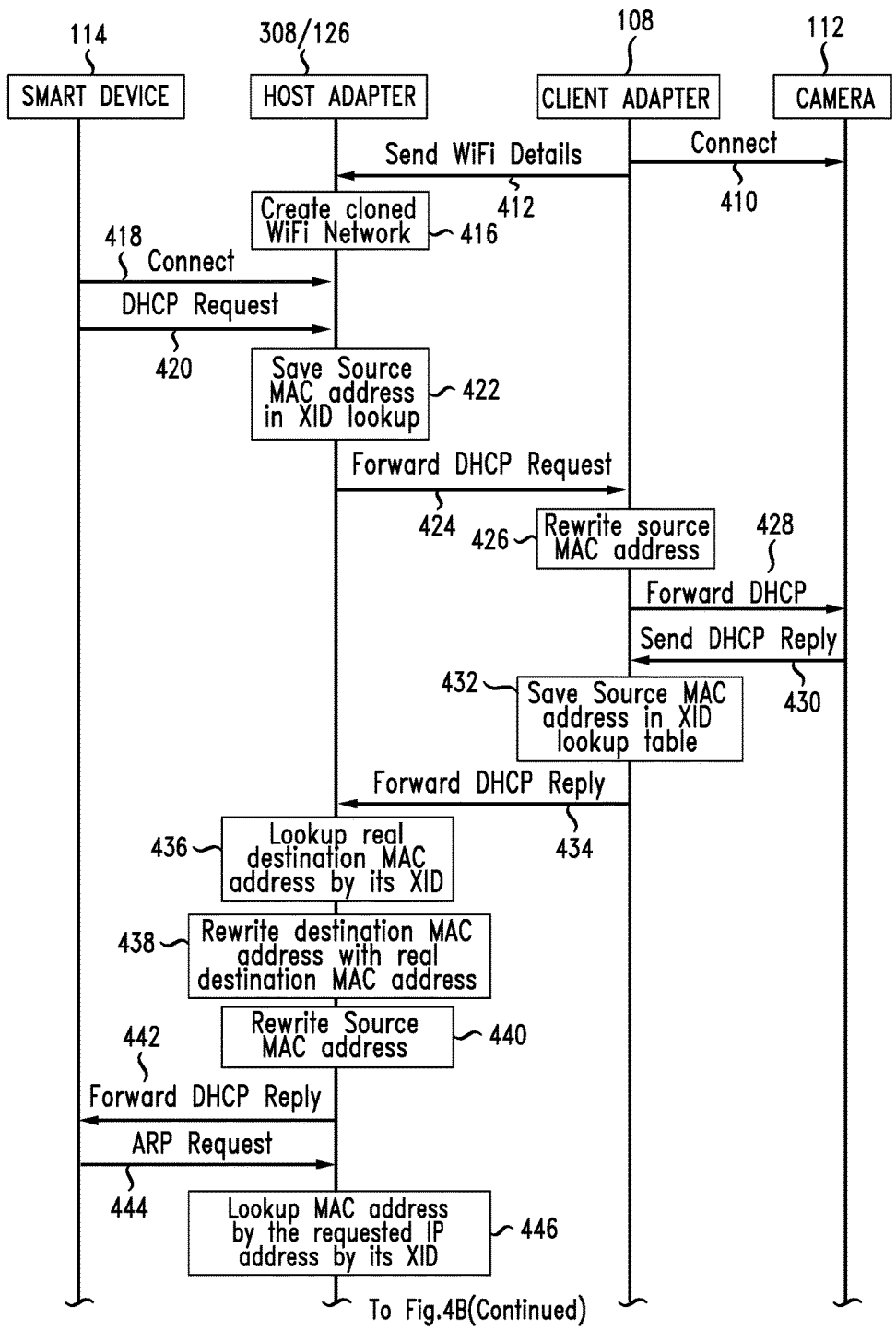
FIG. 4B illustrates signals exchanged between various devices to enable the data to be bridged from a camera to a viewing device.
Figure 4B:
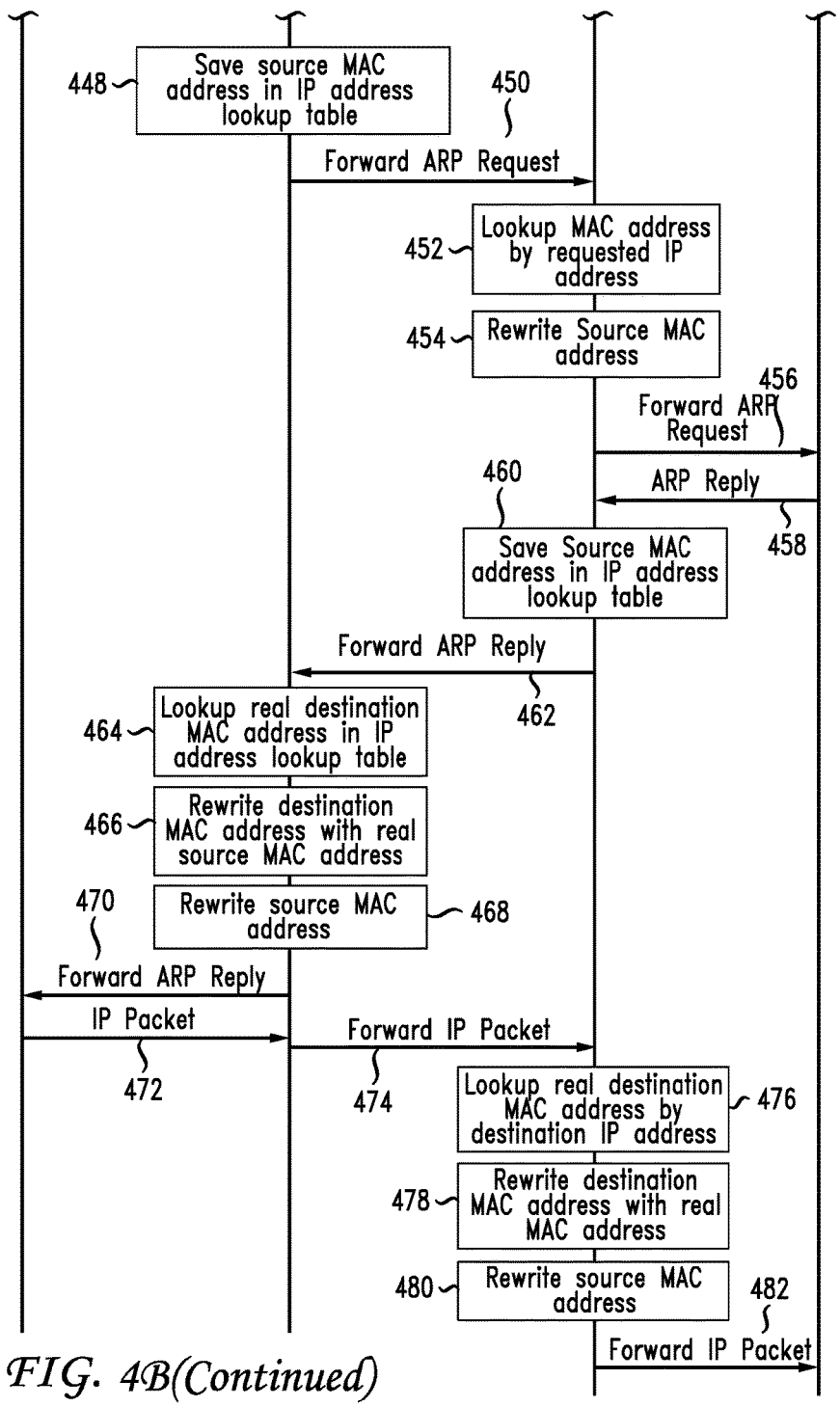

Also shown in FIG. 4 is the user device 114, such as an iPad®, marine navigation system, marine electronics. The user device 114 can communicate wirelessly with a base station or satellite 122. It is noted that if the device 122 is a satellite, that the system 101 shown in FIG. 1 would be used the enable satellite communication. Of course if device 114 is a marine navigation or marine electronics system, it may have built into it satellite communication capability.

The challenge of connecting or bridging these two Wi-Fi signals has been identified by online commentators. Some have argued that a Wi-Fi client connection cannot be bridged. They have noted that the access point is prohibited by the Wi-Fi specification from broadcasting traffic over the Wi-Fi network unless something authorizes that transmission. Because of the technical challenges of performing such a bridging, the following algorithms have been developed for accomplishing the client/host communication disclosed herein.

The present disclosure solves the above-identified problem by rewriting a number of protocols for wireless communication. The algorithm used in the disclosed system is meant to be invisible to both camera and smart device. In simple terms, the signal being transmitted from the host adapter 104 should appear to be the same signal received by client adapter 108. The user device 114 should receive the streaming video from the device 104 exactly the same as if it was all in the air medium and receiving the signal from the camera 112 and without requiring the intervening system 102. Now, different cameras 112 and devices 114 can use different methods/protocols for sending data. For instance, multicast may be used by one camera but not another. The Dynamic Host Configuration Protocol (DHCP) is additional example of this concept. With the different protocols in mind, the following algorithm addresses instructions and communications with system hardware with respect to what to do with data depending on that particular camera streaming methods. The algorithms refer to actions being taken by both the host network 104 and client network 108 when interfacing with their respective camera 112 or user device 114. The result is that the system 102 essentially appears to be transparent to devices 114 and 112.

The first aspect of the algorithm is to adjust the address resolution protocol (ARP). The ARP is used for converting a network address such as an Internet Protocol version 4 (IPv4) address into a physical address or a media access control (MAC) address. A general description of the modified algorithm for the ARP is as follows:
1) Receive an ARP request.
2) Lookup the Internet Protocol (IP) address to see if the system already has it in cache. If so, send an ARP reply with that information to minimize the traffic sent over the bridge.
3) Add the source IP and MAC address to a lookup table for that network adapter.
4) Rewrite the source MAC address to make it look like the packet originated from the system's other wireless adapter.
5) Send the modified ARP request on the other wireless network adapter.

Here is an example of how the ARP can reply:
1) Receive the ARP reply.
2). Find the source IP address in the lookup table for this network adapter.
3) If the system does not have IP address in the lookup table, cache the IP and MAC address pair.
4) If the system does have the IP address but the MAC address is different, update the one in cache.
5) Rewrite the source MAC address to make the packet look like it originated from the other wireless network adapter.
6) Send the modified ARP reply on the other wireless adapter.

Here is a general description of an algorithm for handling traffic using, for example, IPv4 or Internet Protocol version 6 (IPv6):
1) Receive a packet.
2) Lookup the IP address and rewrite the destination MAC address with the one in the cache.
3) If the IP address is not in the cache, synchronously send an ARP request to get it.
4) Rewrite the source MAC address to make the packet look like it originated from other wireless network adapter.
5) Send the modified packet on the wireless network adapter.

In the case of a device using the multicast protocol, here is an updated algorithm for multicast:
1) Check the MAC address to see if it is a broadcast MAC.
2) If it is, send the packet to all other network adapters on the bridge, unmodified.

Here is a proposed algorithm for the Dynamic Host Configuration Protocol (DHCP):
1) Receive a packet.
2) Detect that it is a DHCP packet.
3) Look up the transaction identifier (XID) and rewrite the destination with one in cache.
4) If not in cache, add it.
5) Rewrite source.
6) Rewrite the source MAC address to make the packet look like it originated from other wireless network adapter.
7) Send the modified packet on the wireless network adapter.

Next, we provide a more detailed description of these various algorithms and how they work together to enable the camera 112 to communicate with the device 114.

FIG. 4B illustrates control signals communicated between devices in the system. Time moves from top to bottom and the various signaling is shown between the smart device 114, the host adapter 308/126, the client adapter 108 and the camera 112. The processing begins with a connection signal 410 transmitted from the client adapter 108 to the camera 112. Wi-Fi details 412 are transmitted from the client adapter 108 to the host adapter 308/126 which creates a cloned Wi-Fi network 416. The device 114 connects 418 to the host adapter 308/126 and transmits a DHCP request 420. The host adapter 308/126 saves the source MAC address in the XID lookup 422 and forwards a DHCP request 424 to the client adapter 108. The client adapter 108 rewrites the source MAC address and forwards a DHCP request 428 to the camera 112. The DHCP reply 430 from the camera 112 is transmitted to the client adapter 108, which saves the source MAC address in the XID lookup table 432.

The adapter 108 forwards the DCHP reply 434 to the host adapter 308/126 which looks up the real destination MAC address via its XID 436 and rewrites the destination MAC address with the real destination MAC address 438. The host adapter 308/126 also rewrites the source MAC address 440. The host adapter 308/126 then forwards the DHCP reply 442 to the device 114 and receives an ARP request 444. The host adapter 308/126 performs a lookup of the MAC address by the requested IP address by its XID 446 and saves the source MAC address in the IP address lookup table 448. The host adapter 308/126 forwards the ARP request 450 to the adapter 108, which performs a lookup of the MAC address by the requested IP address 452. The adapter 108 rewrites the source MAC address 454 and forwards the ARP request 456 to the camera 112. The ARP reply 458 from the camera is received at the adapter 108.

The adapter 108 then saves the source MAC address in the IP address lookup table 460 and forwards the ARP reply 462 to the host adapter 308/126, which performs a lookup of the real destination MAC address in the IP address lookup table 464 and rewrites the destination MAC address with the real source MAC address 466 and rewrites the source MAC address 468. The host adapter 308/126 then forwards the ARP reply 470 to the device 114 which transmits an IP packet 472 to the host adapter 308/126, which forwards the IP packet 474 to the adapter 108. The adapter 108 looks up the real destination MAC address by the destination IP address 476 and rewrites the destination MAC address with the read MAC address 478, and rewrites the source MAC address 480. The adapter 108 then forwards the IP packet 482 to the camera 112. In this manner, IP packets can be communicated between the camera 112 and the device 114 through the host adapter 308/126 and the client adapter 108.

Figure 5:
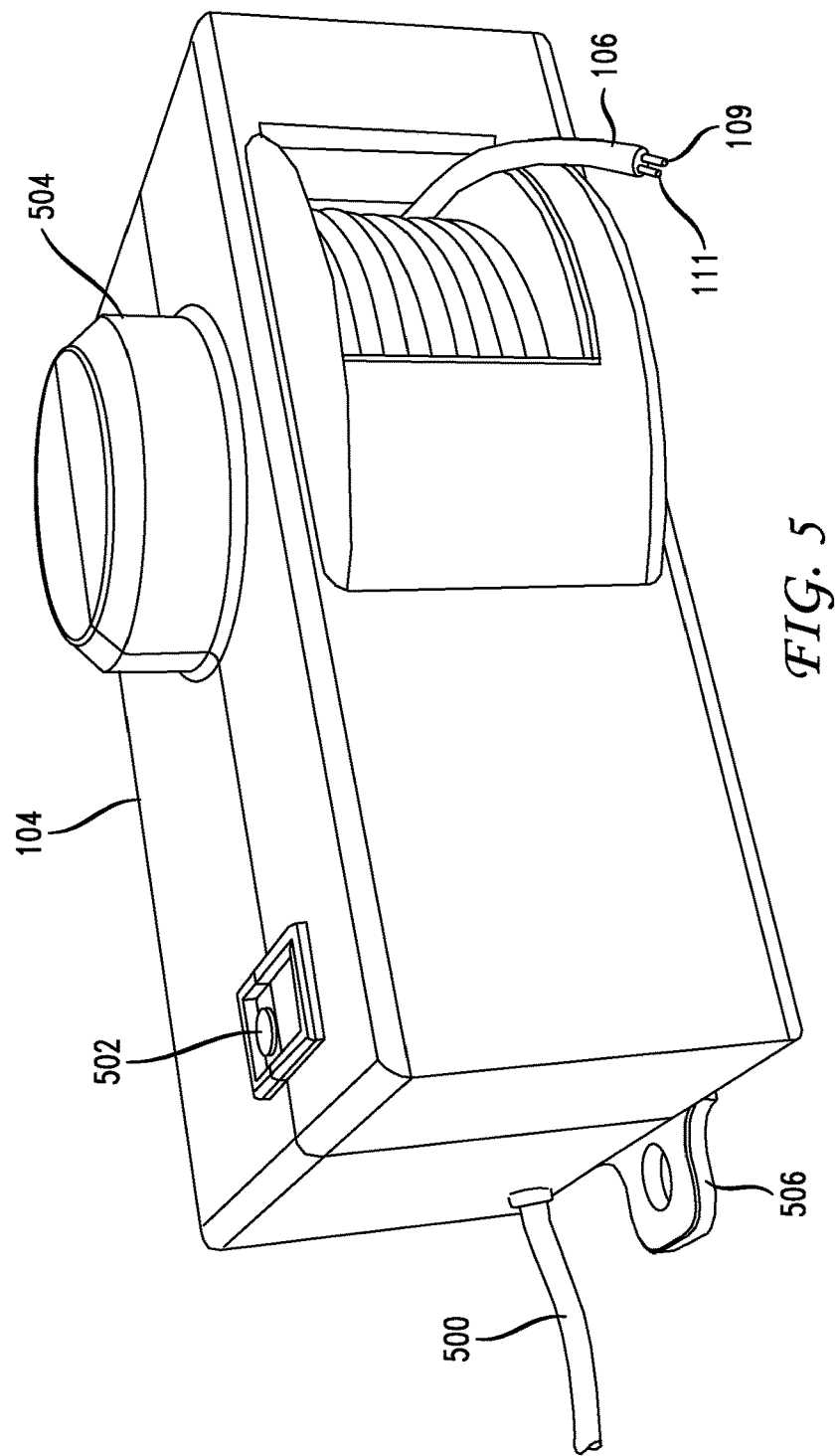
FIG. 5 illustrates in more detail a cable extension and retraction system with a wireless module.

FIG. 5 illustrates an example surface module 104 with Wi-Fi antenna which can be mounted on a boat. The surface module 104 can use a Linux® or other operating system. The surface module 104 will be in an enclosure with power (typically) 5 VDC and have communication ports such as USB ports. The system could allow for multi-tier networking and could allow multiple users at a time as well to establish a connection to another network that might allow streaming over the internet. The surface module 104 with Wi-Fi antenna 504 also allows for multiple cameras to be connected and be merged into a multi-viewable window of more than one camera at a time from one device. The system allows for additional encryption, such that the system is protected from other boats or anglers in the area. The surface module 104 could improve latency and picture quality as well. A power on/off control button 502 can be used to extend the tether 106 which can have multiple cables 109, 111 contained therein for data communication, power, etc. The surface module 104, since in some configurations can be around the water surface, could have a point-to-point type wireless antenna that is highly directional and has very high gain, so that it would transmit from, for example, the dredge back to the transom of the boat. This is a typical configuration but not required. In some cases, it would be advantageous to have omnidirectional antenna or other method depending on the configuration.

Figure 6:
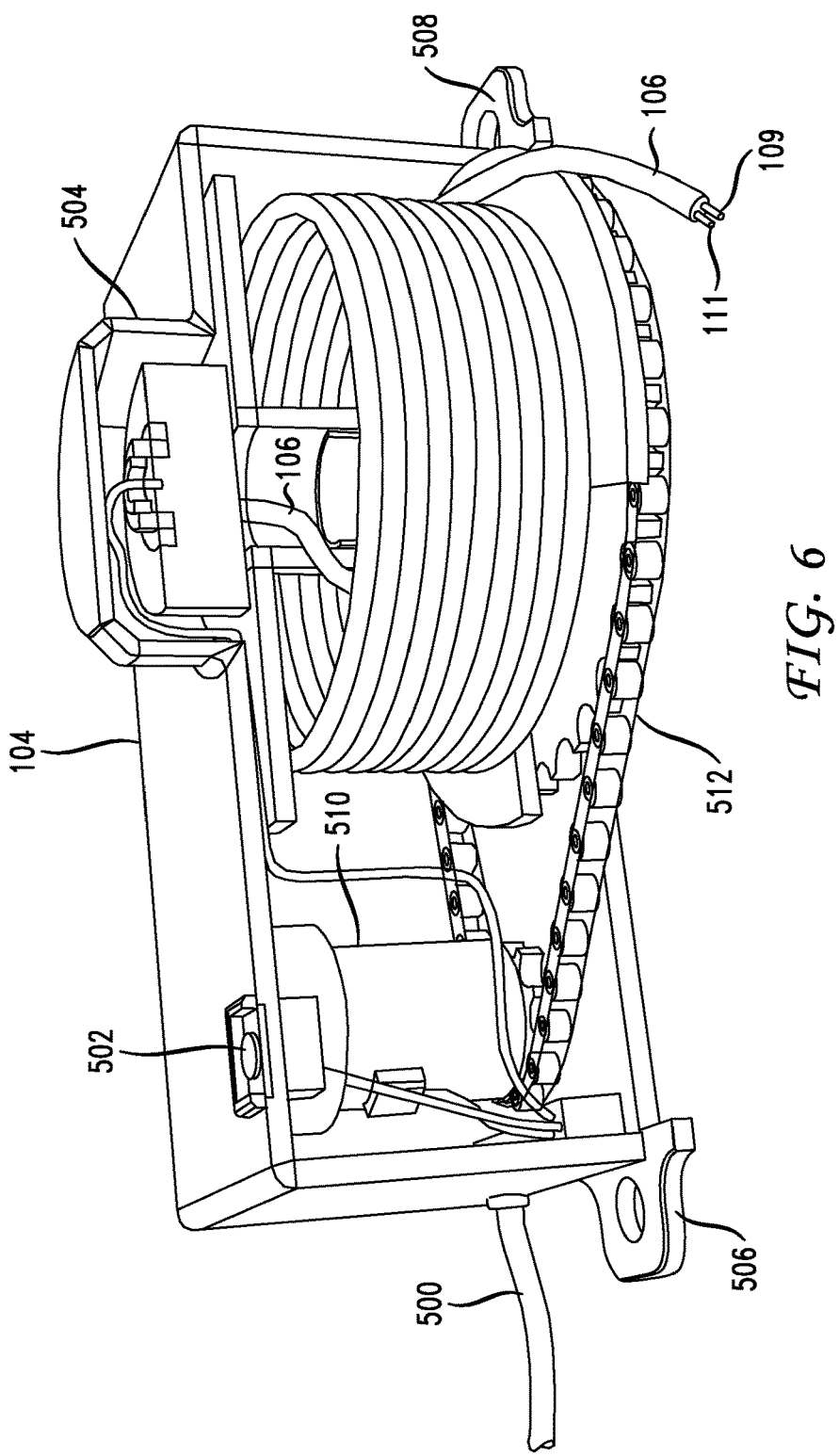
FIG. 6 further illustrates details of the cable extension and retraction system.

FIG. 6 illustrates the housing 104 partially removed to show the DC motor 510, a chain 512, the tether 106 and other internal components for enabling the system to extend and retract the tether 106 from the housing 104. A power cord 500 can provide boat power to the system. The user can control the system or the system can be automated to extend the tether 106 out far enough until the underwater housing 110 is at a certain depth.

Figure 7:
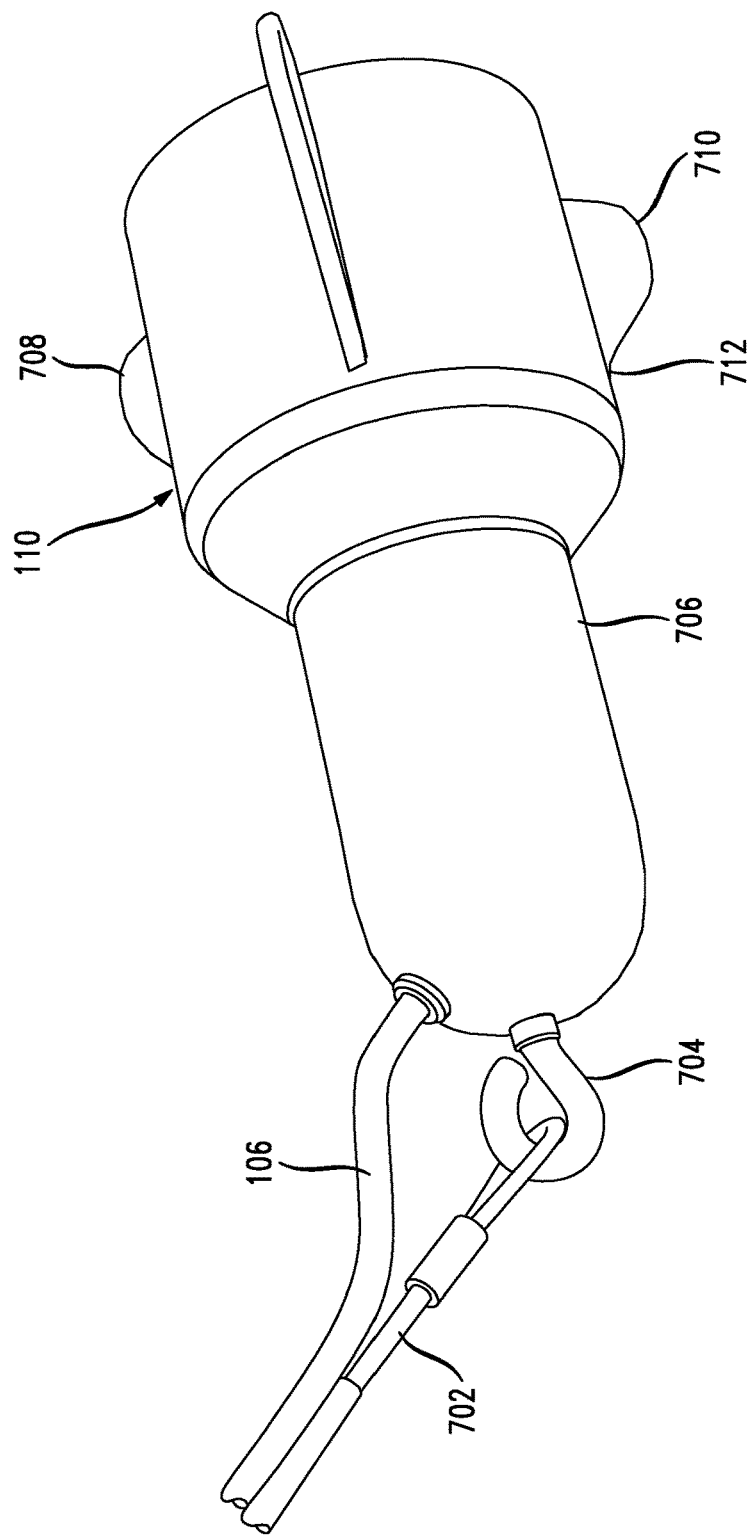
FIG. 7 illustrates the underwater housing component.

FIG. 7 illustrates the underwater housing 110 with an attachment cable 702, an eye bolt 704, and the tether 106. The cable 702 can be incorporated into the tether 106 as well such that part of the wires in the tether 106 could be used for communication and part of the wires could be used to physical hold the housing 110. A front part of the housing 706 will typically hold the underwater wireless module while a rear portion of the housing 712 will be configured to enable the camera 112 to be attached. Fins 708 and 710 are shown as well.

Figure 8:
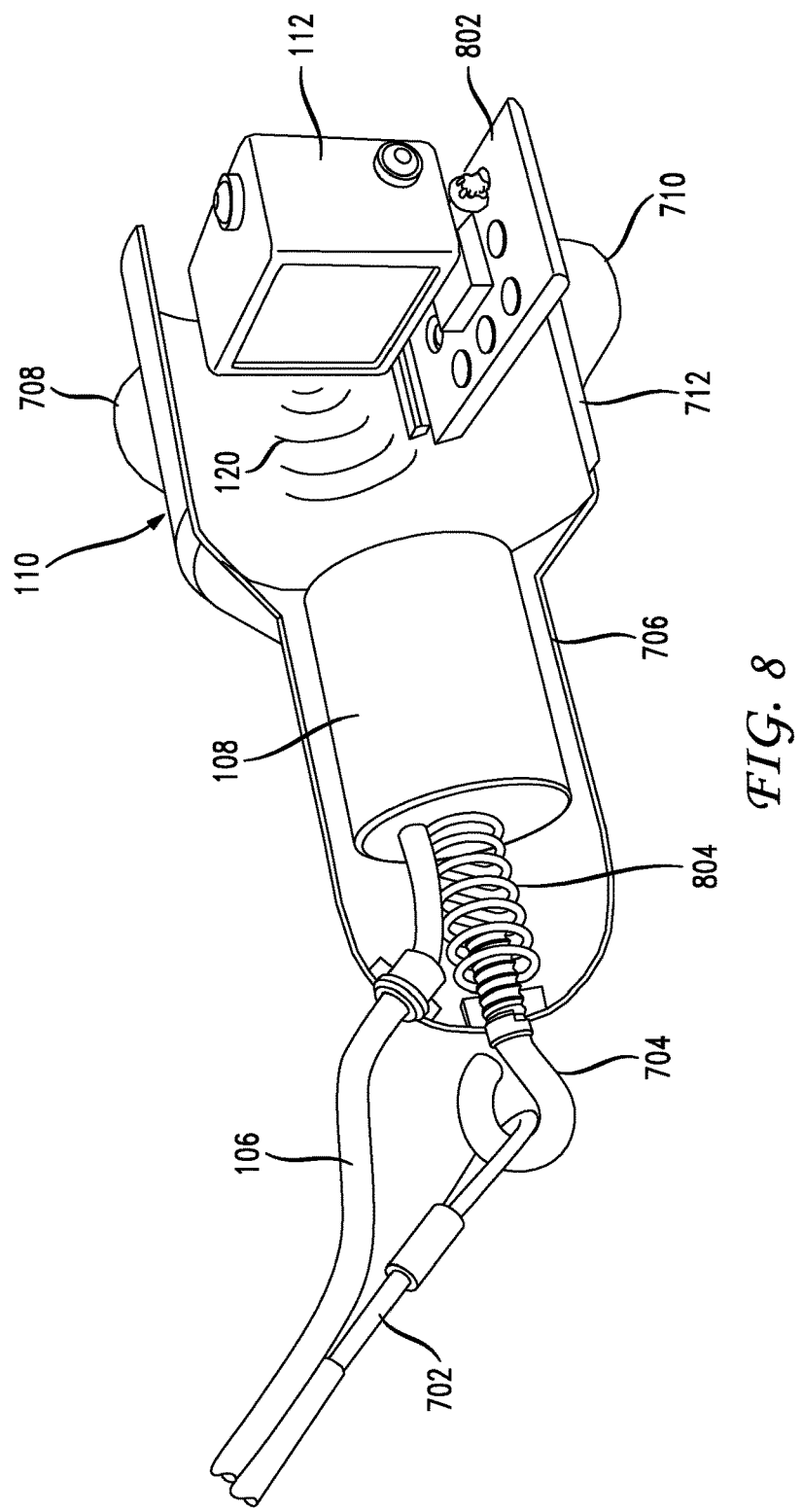
FIG. 8 illustrates some internal modules of the underwater housing component.

FIG. 8 shows a cutaway feature of the housing 110 which illustrates example positions of the underwater wireless module 108, a signal 120 being transmitted from the positioned camera 112 attached via a platform 802 to the housing 110. The distance between the underwater module 108 and the camera 112 is typically within 0 to 10 or 20 inches and is preferably about 3 inches or closer as the signal needs to travel through water which causes dramatic attenuation. Also shown in FIG. 8 is a spring 804 that represents a self-adjusting client module. This would work as follows: The self-adjusting client module could position the transceiver 108 as close as possible in an initial position to the right edge of the housing 110. Then, as a user attaches the camera 112 to the supporting bracket 802, the spring mechanism 804 would contract according to the size of the camera 112. The transceiver 108 would end up directly next to the camera 112 and thus in a close position for a high signal-to-noise ratio to receive a strong signal.

Figure 9:
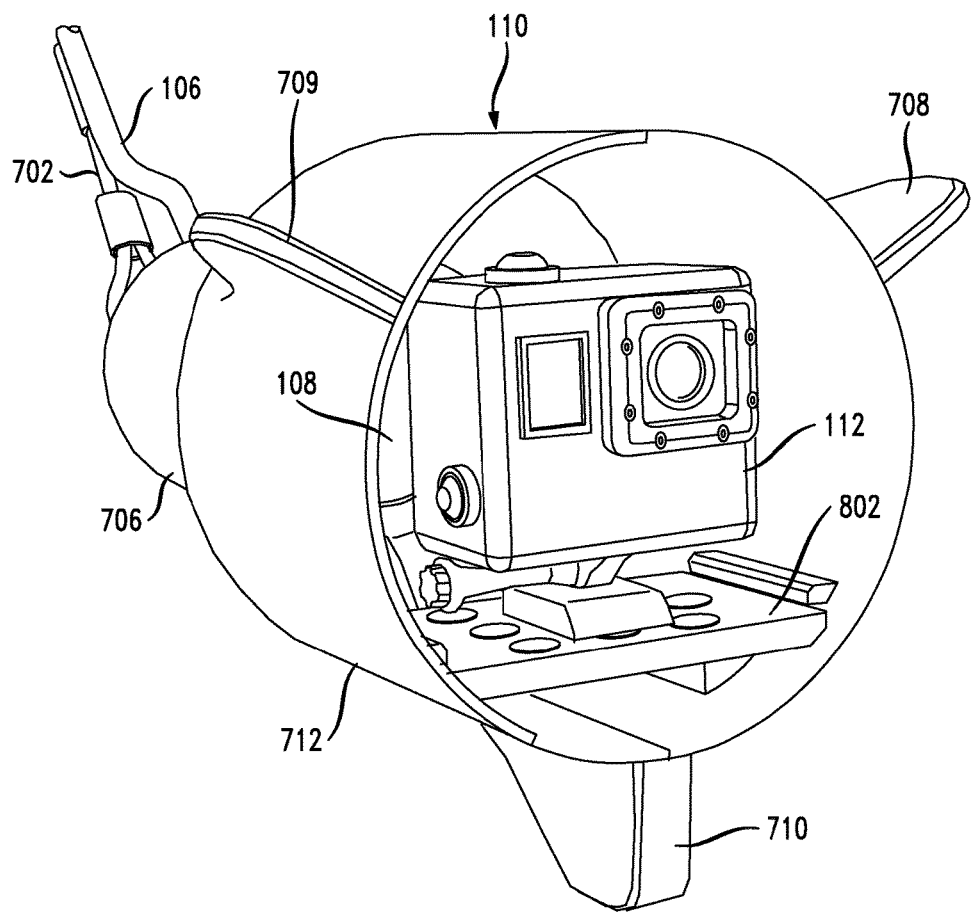
FIG. 9 illustrates how a media capture device can be attached to the underwater housing component.

FIG. 9 illustrates another view of the housing 110 which shows the attachment platform 802 for the camera 112 as well as fins 708, 709, 710. The platform 802 can be configured such that a number of different manufactured media capture devices could be attached. Other configurations include, but are not shown in FIG. 9, such components as housing 110 steering mechanisms, propellers, depth control, sensors, lights, batteries, etc. These alternate components can be easily configured within the housing 110 at appropriate locations and have either wires or wireless connections to the underwater module 108.

Figure 10:
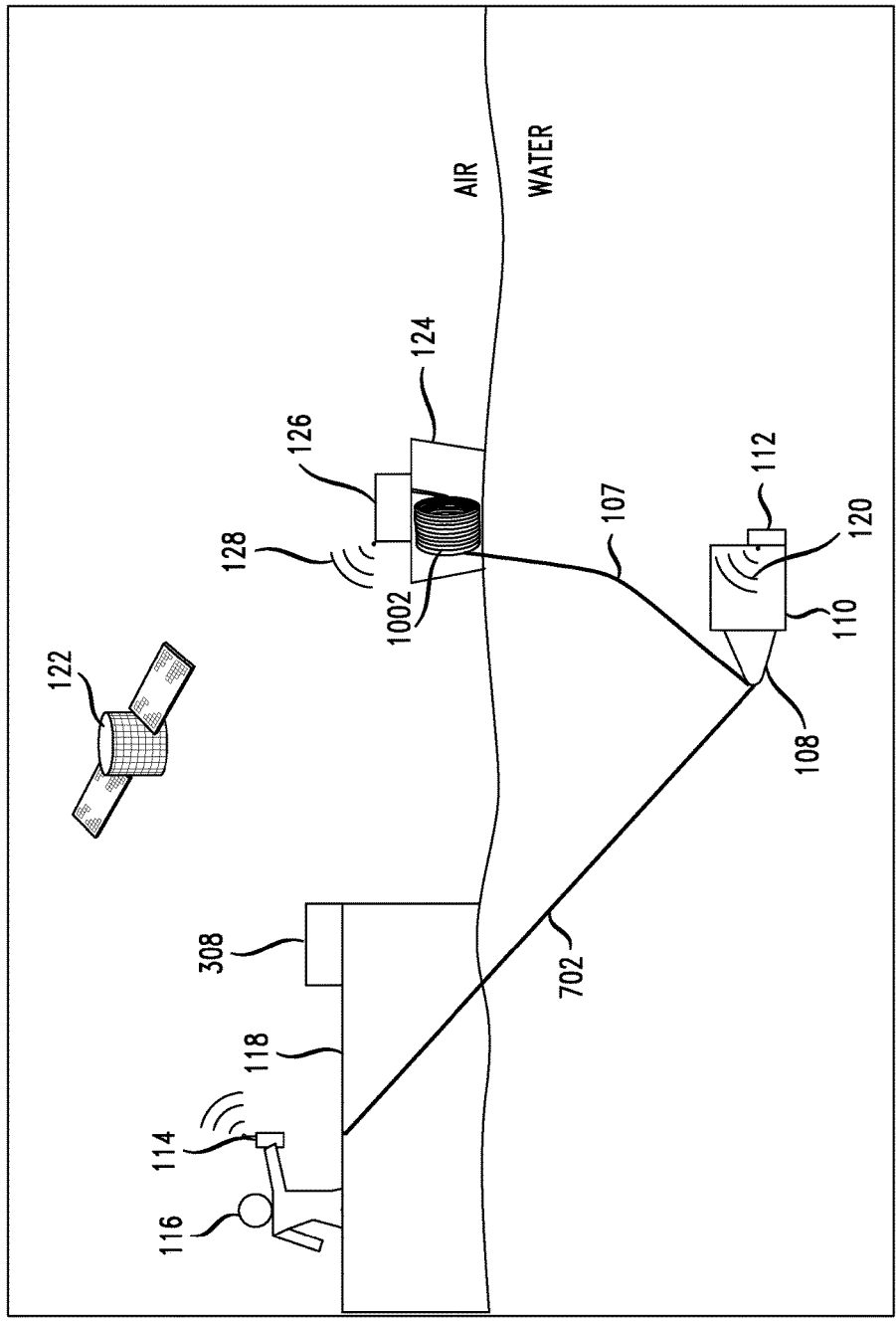
FIG. 10 illustrates an aspect of the system with a floating wireless module.

FIG. 10 shows an example system in which the above-water module 126 is configured in a floating device 124. In this case, a cable 702 attaches the housing 110 to the boat 118. The tether 107 is configured to exit housing 110 above the underwater module 108. Note feature 1002, which is a tether extension and retraction system. When this configuration is deployed, the floating device 124 having the above-water module 126 can have the tether 107 completely retracted into the spool in 1002. Thus, the floating device 124 can physically be right next to the housing 110. However, when the user throws the housing 110 with the floating device 124 with the retracted tether 107 into the water, the device 124 will float and the housing 110, which does not float, will start to sink in the water. In this situation, the system 1002 will start to extend the tether 107 as the housing 110 sinks. A proper tension in the extension/retraction system 1002 can be set and maintained so that the tether 107 will properly deploy. The cable 702 connects the housing 110 to the boat. When the video or image capture is finished, a signal can be transmitted to the device 126 which will cause a motor to retract the tether 107 and thus bring the housing 110 together with the floating device 124 for retrieval from the water as a unit.

In summary, the system 102 is a smart pass-through and performance computing device that allows a user to connect to the underwater Wi-Fi camera 112 with any client Wi-Fi-enabled device 114 above water and be able to control and monitor the camera 112 in real time. In particular, the system disclosed herein is not locked into any one camera on the market since the connection with the camera is via Wi-Fi. As long as the camera is within a range of a few inches (which will increase as new hardware advances allow for stronger, more efficient signals) of the underwater wireless interface module 108, the system works. The system also allows for autonomous actions to take place. The basic system provides video to those at the surface. More advanced models of the disclosure can also provide useful data so the user knows where to position the camera in the water. The Wi-Fi connection could also allow for two-way communications to any camera 112 with Wi-Fi capability so that the camera 112 becomes maneuverable and controllable. This is extremely useful when searching for fish. This system solves the problem for many who currently use their camera to film underwater footage but want to view the footage in real time from their personal wireless device 114. It also allows the user to maneuver the camera 112 independently of the boat 118. The saltwater sport fishing community is waiting for a device such as this and there could be many more exciting applications of this system. This disclosure is meant to provide a way for recreational users to use any Wi-Fi cameras 112 to their maximum potential even when submerged many feet underwater.

Disclosed is a universal camera mounting platform and self-adjusted transceiver. FIG. 9 can be referenced for this discussion. In many implementations of the proposed technology, the camera 112 will be put into a protective waterproof housing and be configured within a larger housing 110. The camera 112 is mounted inside the housing 110 and situated in an orientation for gaining the optimal view. The housing 110 could be completely open for water to flow freely throughout. Water flowing throughout is useful for the units' ability to move quickly through water and avoiding buoyancy issues. The advantage of wireless video streaming opposed to anticipated connections, such as HDMI cables, etc., is that when it comes to camera mounting 802, a single configuration can accommodate most camera form factors. Similar systems that use cabled options for providing power, communications etc., are then limited to only particular form factors, not anticipating the next generation of camera particular form factors.

Also, many cameras 112 are not waterproof out of the box but require a separate waterproof housing. Because of this, each particular camera may require a different setup, whereas wireless is universal because there are no wires to protect. Also, adding extension batteries can change the form factor of the camera but the wireless will still work just as well, while the camera 112 will last much longer with the larger battery. Not being tied to particular cameras, form factors or mounting configurations, allows the system to grow with future cameras with multiple form factors and configurations. While the disclosed system 102 allows for the video wireless signals to transmit through the water, the system can use a self-adjusting transceiver that will adjust its extension based about the cameras depth. As the camera is placed inside the housing, the transceiver assembly 706 could slide towards the rear of the housing and then return to the full extension when the camera is removed. The wireless system in this disclosure grows with new technology. The user is not tied to a dedicated camera. Not only can the user upgrade as new cameras come out but the user can now have a camera for multiple uses instead of many systems that require the user to purchase dedicated camera which is hardwired into the system.

As new cameras 112 emerge with features like 360-degree view, better codecs for higher resolution and lower latency, and other enjoyable features, the user will not need to purchase a new system to accommodate them. This feature is useful for captains who will have customers with different cameras that might want to use the system. Indeed, the housing 110 could also be configured such that it can be sized to receive two cameras 112 and both can communicate with the transceiver 108 to individual users on the boat with their individual devices. More than two cameras 112 could also be mounted in the housing 110.

Figure 11:
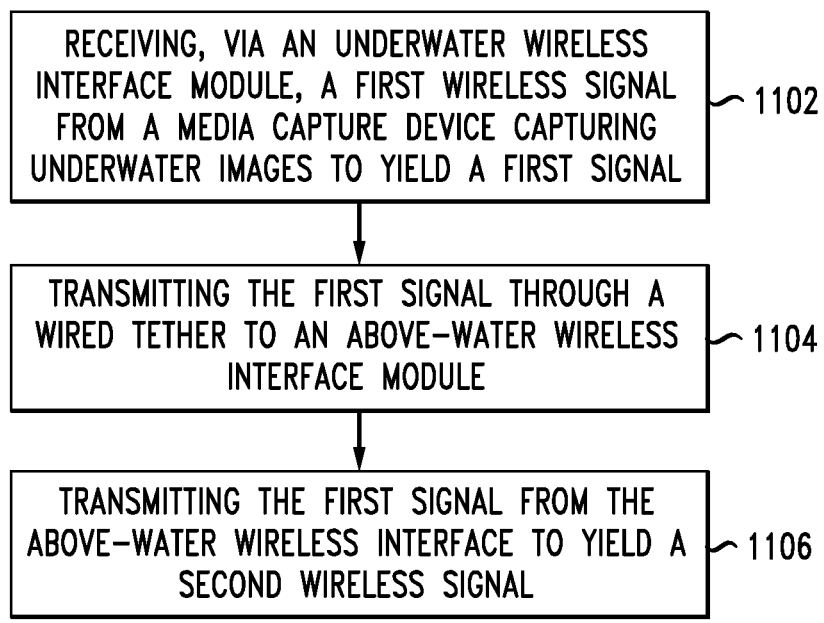
FIG. 11 illustrates a method aspect.
Figure 12:
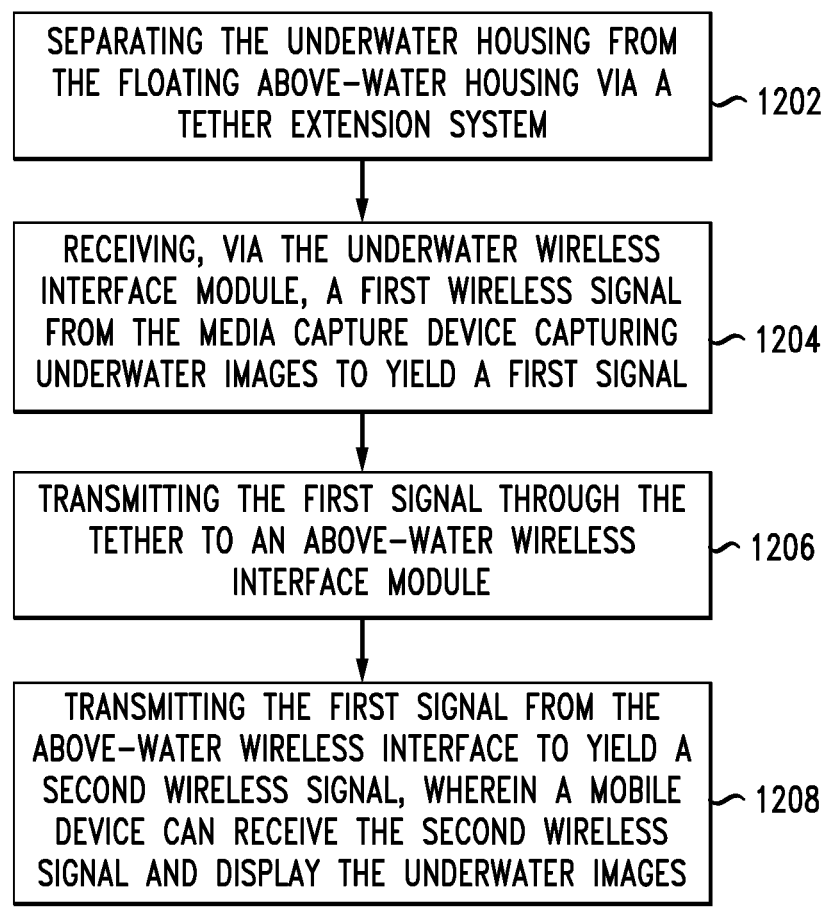
FIG. 12 illustrates another method aspect.

Having disclosed some basic system components and concepts, the disclosure now turns to the exemplary method examples shown in FIGS. 11 and 12. For the sake of clarity, the method is described in terms of an exemplary system as discussed above configured to practice the method. The steps outlined herein are exemplary and can be implemented in any combination thereof, including combinations that exclude, add, or modify certain steps.

FIG. 11 illustrates an example method aspect of this disclosure. A method includes receiving, via an underwater wireless interface module, a first wireless signal from a media capture device capturing underwater images to yield a first signal (1102), transmitting the first signal through a wired tether to an above-water wireless interface module (1104) and transmitting the first signal from the above-water wireless interface to yield a second wireless signal (1106), wherein a mobile device can receive the second wireless signal and display the underwater images. The above-water wireless interface modules can be secured to a boat or have a separate floating device which is separated from a boat to which the underwater interface module is attached. The underwater wireless interface module and the above-water wireless interface module each utilize one of a same wireless protocol and a different wireless protocol. For example, the underwater wireless interface module can us a Wi-Fi protocol or any other wireless protocol that enables communication. Because of attenuation of the wireless signal from the media capture device in the water, the underwater wireless interface module is positioned within 3 inches or closer of the media capture device in an underwater housing.

In another aspect shown in FIG. 12, a method of operating a wireless communication system is disclosed. The wireless communication system includes several components including (1) an underwater housing having an underwater wireless interface module communicating with a media capture device and (2) an above-water wireless interface module configured in a floating above-water housing, the underwater wireless interface module communicating with the above-water wireless interface module via a tether. In this aspect, the method includes, when a wireless communication system is placed in a body of water and when a weight of the underwater housing causes the underwater housing to sink in the body of water, performing the steps of: (1) separating the underwater housing from the floating above-water housing via a tether extension system (1202); (2) receiving, via the underwater wireless interface module, a first wireless signal from the media capture device capturing underwater images to yield a first signal (1204); (3) transmitting the first signal through the tether to an above-water wireless interface module (1206); and (4) transmitting the first signal from the above-water wireless interface to yield a second wireless signal, wherein a mobile device can receive the second wireless signal and display the underwater images (1208). A tether extension and retraction system enables the tether to be extended to separate the floating above-water housing from the underwater wireless interface module. The tether extension and retraction system is configured such that the tension caused by the underwater housing sinking due to its weight and the floating above-water housing not sinking but staying on the surface cases a roller within the extension and retraction system to extend out the tether. Those of skill in the art will understand the basic components and mechanisms for use in the tether extension and retraction system.

It is noted that it is immaterial whether the actual tether extension and retraction system is positioned on the floating above-water housing or whether the tether extension and retraction system is positioned on the underwater housing.

FIGS. 13A-F illustrate another aspect of signal processing between various devices or components within the system. The figures and signally flow illustrate an example system 1300 with various components working together to enable the bridge system 1308 to connect a client device 1310 with a capture device 1302. The system 1308 bridges the camera 1302 to the client device 1310 by communicating data via a host adaptor of the bridge system 1308, and through a WiFi protocol 1312 with the capture device 1302. The host adaptor 1304 communicates via a wired connection 1305 with a client adapter 1306. The client adapter 1306 communicates via a WiFi protocol 1314 with a client device 1310. Other wireless protocols could be deployed as well.

The process includes a calibration preparation process and back end algorithm for live operation to communicate data. The method autonomously bridges a WiFi 1312, 1314 signal between both client 1310 and media capture (host) 1302 devices and requires first defining which bridge adapter 1304, 1306 on the bridge will be host adapter 1304 and which will be the client adapter 1306. The adapter selection or assignment is determined through an autonomous process called calibration. The calibration process can begin once the bridge 1308 has been programmed with the WiFi SSID (service set identifier) and password for the camera's 1302 wireless network and consists of 32 octets that frequently contain a human readable identifier of the network. It is used as an identifier for a wireless local area network, and it is intended to be unique for a particular area. It is often a human readable string, and thus is commonly called the "network name." For example, the SSID could be "GoPro" if the user is using a GoPro™ camera 1302 in the system. The protocol for wireless communication 1312, 1314 can be any protocol and is not restricted to WiFi.

The calibration process is as follows. First the user powers on the WiFi bridge 1308 and via a bridge user interface prompt, enters the SSID and the password for the camera 1302. Based on a bridge UI prompt to turn on camera and prepare the camera, the user would mount the camera 1302 into a host housing as is disclosed herein. The user can then drop the housing structure underwater. At this point, one adaptor might be above water on a boat, and a second adaptor of the bridge system 1308 may be underwater or near the housing which contains the capture device 1302.

Both the first adapter 1304 and the second adapter 1306 turn on to discover the camera 1302. Based on a signal-to-noise ration evaluation or some other data, the adapter between adapter 1304 or adapter 1306 with the strongest signal-to-noise ratio (SNR) is set or assigned respectively as a host or a client adaptive. The assignment can be made by a process of elimination or any other process. For example, the first adaptor may be the closest to the device 1302 and thus have to strongest signal, and thus be determined or assigned to be the host adaptor 1304.

In FIGS. 13A-13F, the host adapter 1304 is set as the adapter closest to the camera and the client adapter 1306 is set as the adapter closest to the client device 1310. In one scenario, as adapter 1304 and 1306 come on, they both will try to discover the camera 1302 and since adapter 1304 is closer to the camera 1302 by virtue of being in or near the housing 110 that will hold the camera 1302, that adapter will be assigned as the host adapter 1304. This scenario is of course configurable between which adapter assigned to the client and to the host. The assignment can also be made by any process, including a manual process.

In some scenarios, camera 1302 is dual band in that it can have multiple frequency ranges which to use for communication. For example, some devices 1302 will use a 2.4 GHz band or a 5 GHz band for communication. In one scenario, a frequency band priority can be forced for cameras having dual band capability. The forcing can be initiated by a signal transmitted from the bridge system 1308 instructing the capture device 1302 to utilize a certain band. One reason for such forcing would be to utilize a frequency that attenuates less in water. Accordingly, one step in the process can be forcing the camera 1302 to select the 2.4 GHz frequency band for improved transmission through a water medium between the camera 1302 and the host adapter 1304. Of course, if the capture device 1302 only can utilize one frequency band, no assignment or prioritization is possible. The method can also include determining whether the device 1302 utilizes potentially two or more bands and then prioritizing or assigning which band should be used.

Once the system 1300 is calibrated, the adapters 1304, 1306 have been assigned, and frequencies have been prioritized (if necessary), the user can proceed and the back end algorithm will begin. In summary, the calibration process is an autonomous way for the bridge system with to determine which adapter will be host and which will be client. This is accomplished by placing one adapter under water with the camera with the camera on and doing an SNR check on both adapters to see which has the stronger signal. The bridge 1308 can also use available frequency band selection and force the host to have a lower frequency selection since the host will be underwater and lower frequencies travel further through the water medium. Other approaches can also be applied to assign client and host adapters.

Figure 13A:
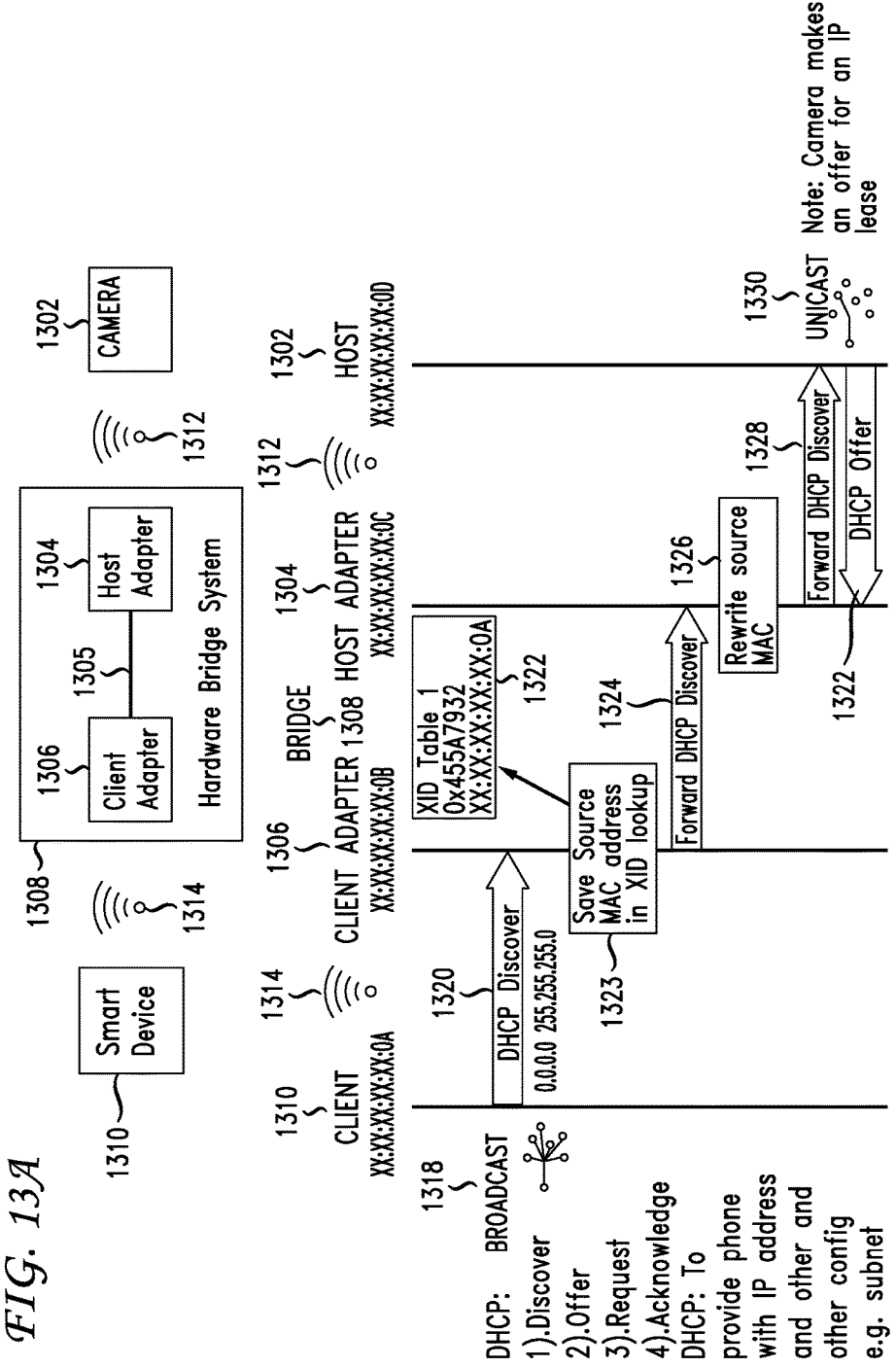
FIGS. 13A-F illustrate another aspect of signal exchange between various component.
Figure 13B:
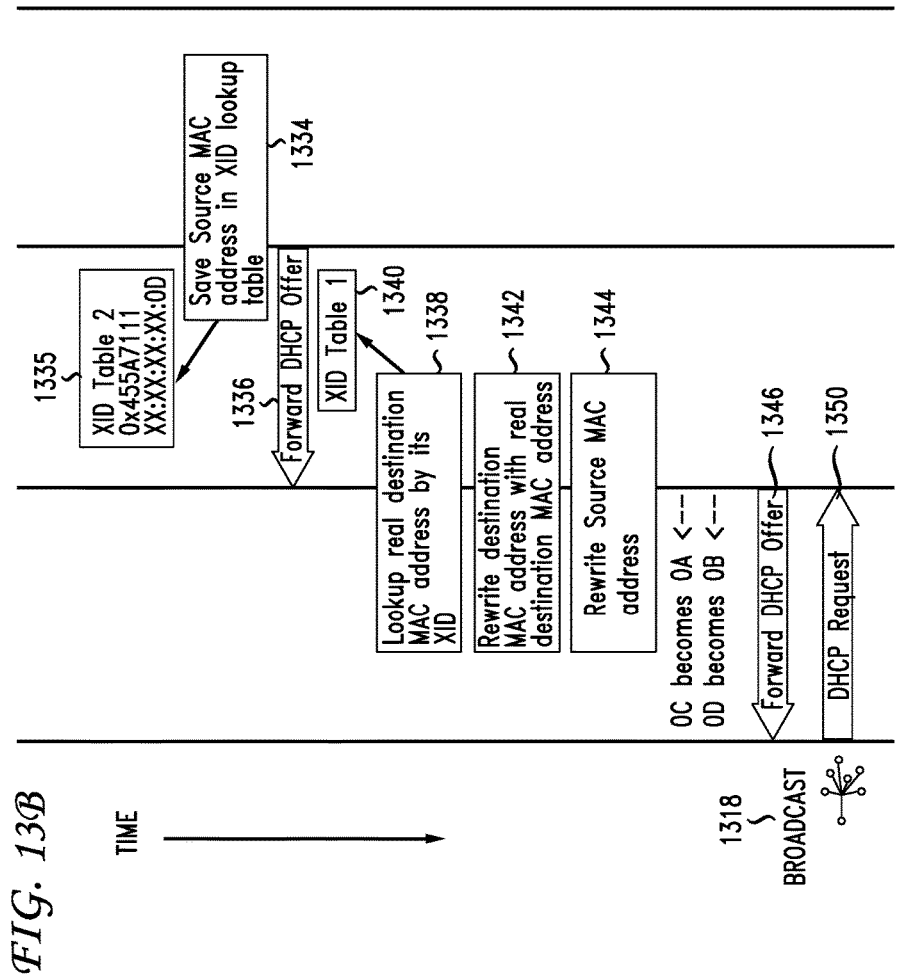
Figure 13C:
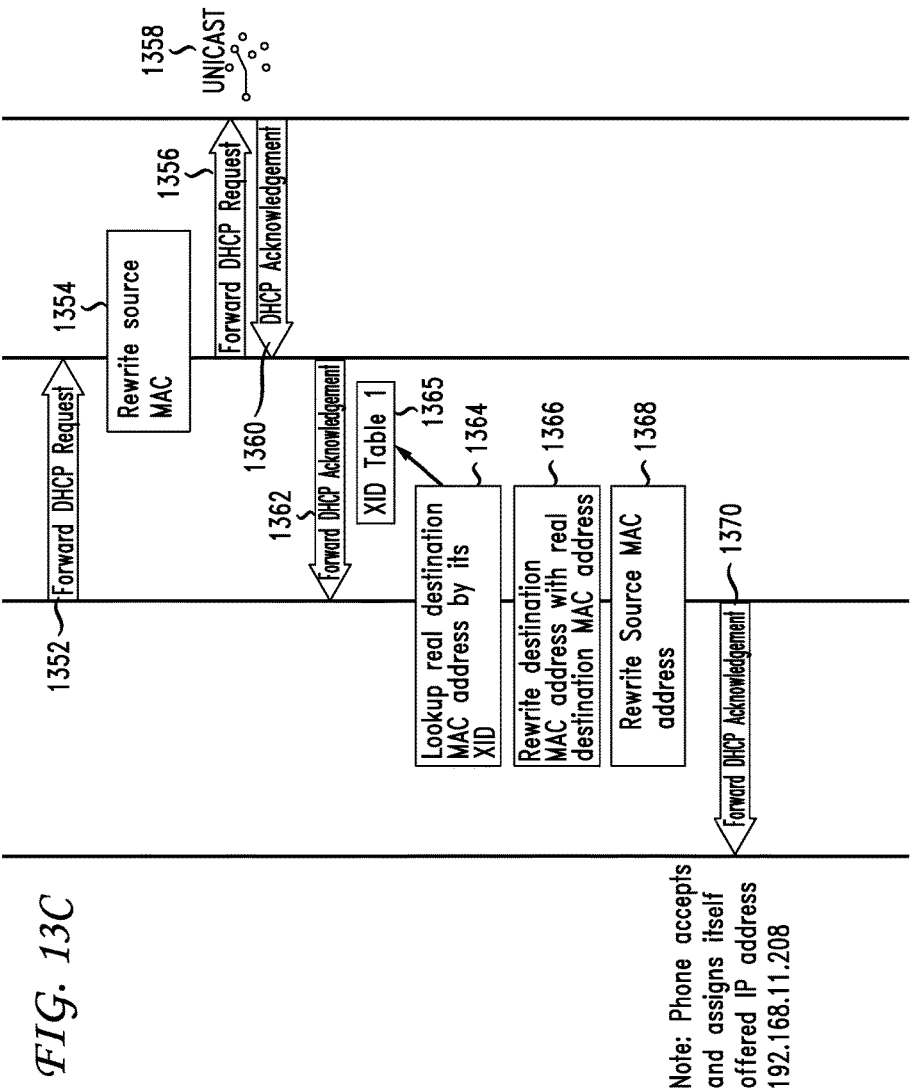
Figure 13D:
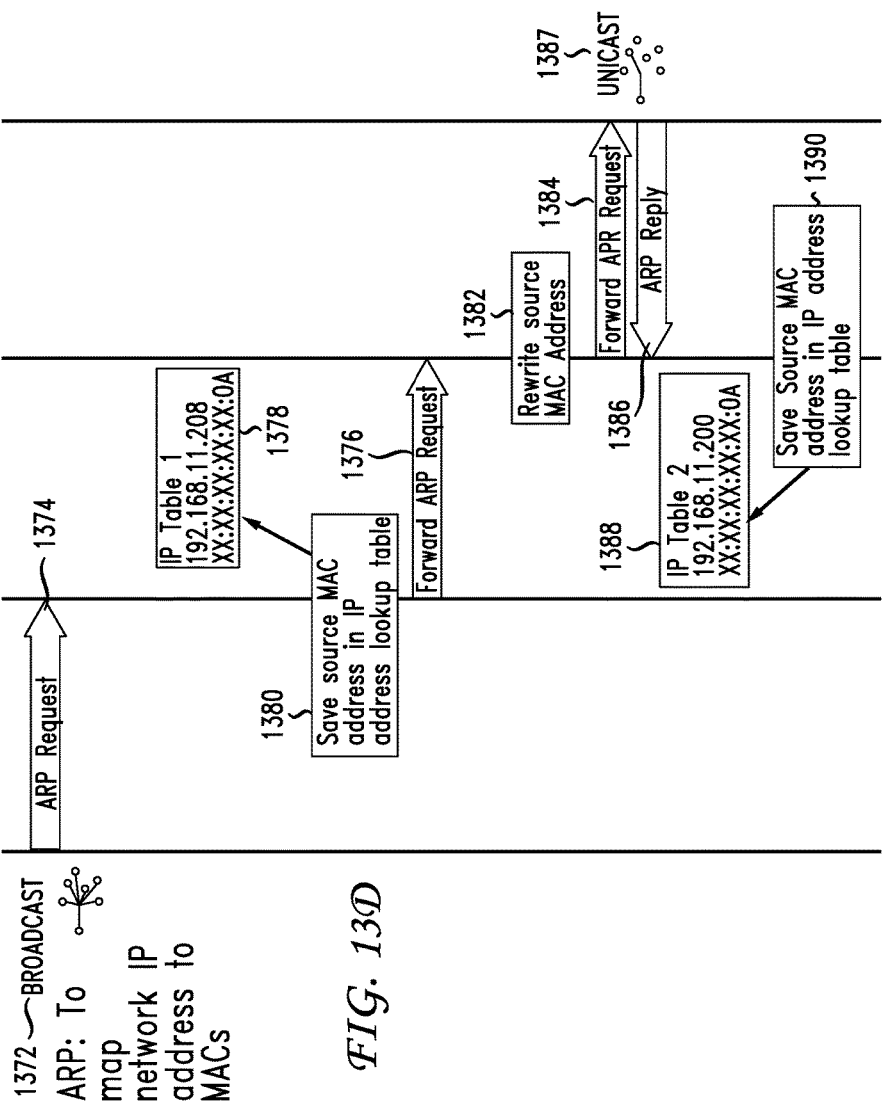
Figure 13E:
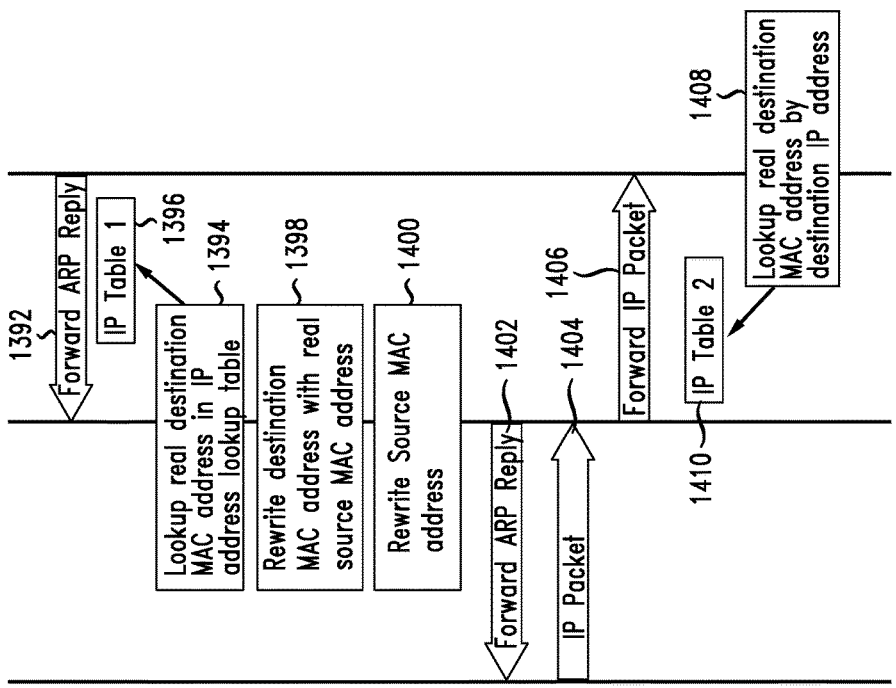
Figure 13F:
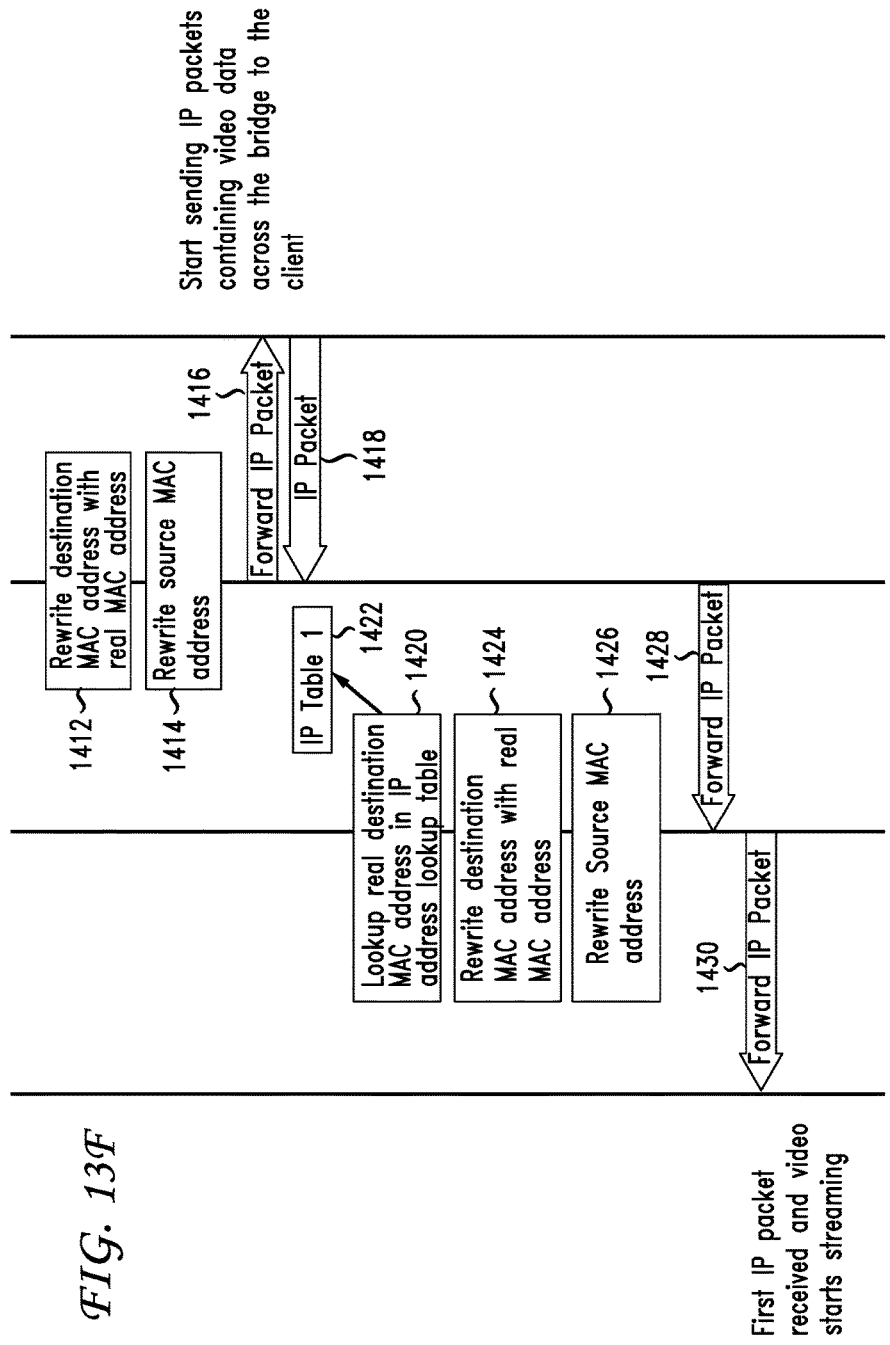

FIGS. 13A-C also show the detailed processing of the algorithm between client 1310 and host 1302 through the bridge 1308. The dynamic host configuration protocol (DHCP) process mainly involves a discovery signal broadcast 1318 from the client 1310 for the purpose of receiving an offer, and then requesting an IP address, and acknowledging the receipt of the IP address of the camera 1302, such that the client 1310 can be provided with the IP address of the camera 1302 and any other configuration necessary for the client 1310 to communicate with the camera 1302 through the bridge system 1308.

The DHCP is controlled by a DHCP server which, in the network 1300, can be the camera 1302, which will dynamically distribute network configuration parameters, such as IP addresses. In one scenario, the camera 1302 has a static IP address, such as, for example, 192.168.11.200.

In the following example, the MAC address of the various nodes will be as follows:

Client 1310: XX:XX:XX:XX:XX:OA
Client Adaptor 1306: XX:XX:XX:XX:XX:OB
Host Adaptor 1308: XX:XX:XX:XX:XX:OC
Camera 1302: XX:XX:XX:XX:XX:OD When the client adapter 1306 receives the DHCP discover 1320 signal, the XID table 1 1322 saves the source MAC address 1323. The client adapter 1306 forwards the DHCP discover signal 1324 to the host adapter 1304. The host adapter 1304 can rewrite the source MAC address 1326. The host adapter 1304 forwards the DHCP discover signal 1328 to the camera 1302. The camera 1302 responds with a DHCP offer 1332. The camera can make the offer for an IP lease using a unicast approach 1330. The host adapter 1304 saves the source MAC address in its XID lookup table 2 1334, 1336. At this stage, the XID table 1 stores the client 1310 MAC address and the XID table 2 saves the camera 1302 MAC address.

The host adapter 1304 forwards the DHCP offer 1336 to the client adapter 1306. The client adapter 1306 looks of the real destination MAC address by its XID lookup table 1 1340. The client adapter 1306 then rewrites the destination MAC address with the real destination MAC address 1342 an rewrites the source MAC address 1344. At this stage, in the XID table 1, the OC become OA and the OD becomes OB with respect to the stored MAC addresses.

The client adapter 1306 then forwards the DHCP offer 1346 to the client through, for example, a broadcast signal 1348. The client 1310 transmits a DHCP request 1350 to the client adapter 1306. The client adapter 1306 forwards the DHCP request 1352 to the host adapter 1304. The host adapter rewrites the source MAC address 1354 and forwards the DHCP request 1356 to the camera 1302. Through a unicast approach 1358, the camera 1302 transmits a DHCP acknowledgment 1362 to the host adapter 1304. The host adapter forwards the DHCP acknowledgment 1362 to the client adapter 1306. The client adapter 1306 looks up the real destination MAC address by its value 1354 in the XID table 1 1365. The client adapter 1306 rewrites the destination MAC address with the real destination MAC address 1366. The client adapter 1306 rewrites the source MAC address 1368. The client adapter 1306 then forwards the DHCP acknowledgment 1372 the client 1310.

At this stage, the client 1310 will accept and assign itself the offered IP address, for example, of 192.168.11.208. Through a broadcast signal 1372, the client 1310 will then send an ARP (address resolution protocol) request 1374. The ARP request is a request to map the network IP address to the MAC addresses. The client adapter 1306 will save the source MAC address in the IP address lookup table 1380. For example, in the IP table 1, the IP address of 192.168.11.208 will map to the MAC address XX:XX:XX: XX:XXOA. The client adapter 1306 will then forward the ARP request 1376 to the host adapter 1304. The host adapter will rewrite the source MAC address 1382 and forward the ARP request 1384 to the host 1302. Through a unicast approach 1387, the camera 1302 will transmit an ARP reply 1386 to the host adapter 1304. The host adapter 1304 will save the source MAC address and IP address lookup table 1390. For example, IP table 2 1388 will store the IP address 192.168.11.200 mapped to MAC address XX:XX:XX:XX: XXOA.

The host adapter 1304 will then forward the ARP reply 1392 to the client adapter 1306. The client adapter 1306 will look up the real destination MAC address in the IP address lookup table 1394, 1396, and rewrite the destination MAC address with the real source MAC address 1398 and rewrite the source MAC address 1400. The client adapter 1306 will then forward the ARP reply 1402 to the client 1310.

At this stage, the client 1310 is ready for video transmission from the capture device 1302 in TCP, UDP, or any other protocol in which IP packets 1404 can be transmitted from the client 1310 to the client adapter 1306 which forwards the IP packet 1406 to the host adapter 1304. The host adapter looks up the real destination MAC address by the destination IP address 1408 according to IP table 2 1410. The host adapter 1304 rewrites the destination MAC address with the real MAC address 1412 and rewrites the source MAC address 1414. The host adapter 1304 forwards the IP packet 1416 to the camera 1302. Again, at this stage, the camera 1302 can start sending IP packets containing video data across the bridge to the client 1310. An IP packet 1418 is shown as being transmitted from the camera 1302 to the host adapter 1304. The client adapter 1306 will look up the real destination MAC address and IP address lookup table 1420, as is shown in feature 1422. The client adapter 1306 will rewrite the destination MAC address with the real MAC address 1424 and rewrite the source MAC address 1426. The host adapter 1304 will forward the IP packet 1428 to the client adapter 1306, which will then forward the IP packet 1432 to the client 1310. The forwarded IP packet 1430 can represent the first IP packet received by the client 1310 and can represent when the video can start streaming from the camera 1302 to the client 1310.

The various protocols described above represent a detailed process for utilizing a back end bridging algorithm which enables the hardware bridge system 1308 to function as a bridge system for sending IP packets between a camera 1302 and a client device 1310. The various embodiments disclosed herein can be claimed from any node within the system. For example, claims can be directed for the view or functionality performed by one or more of the client 1310, the client adapter 1306, the host adapter 1304, the bridge system as a standalone device 1308 and/or the camera 1302. The claims can be directed to the calibration process which establishes the set up and calibration of the client adapter and the host adapter in connection with the client 1310 and camera 1302 devices such that this user can proceed to use the hardware bridge system for communicating images and/or video from the camera 1302 to the client 1310. Sound can also be communicated as well. Any data that can be captured by the device 1302 can be communicated through the hardware bridge system 1308 to a device 1310. Depending on the standpoint of any given claim, all of the appropriate signaling is included from the standpoint of that respective node. For example, signals received, processes occurring, and signals transmitted from any individual node within the system 1300 can be claimed, and all such signaling and processing is considered within the scope of this disclosure.

Figure 14:
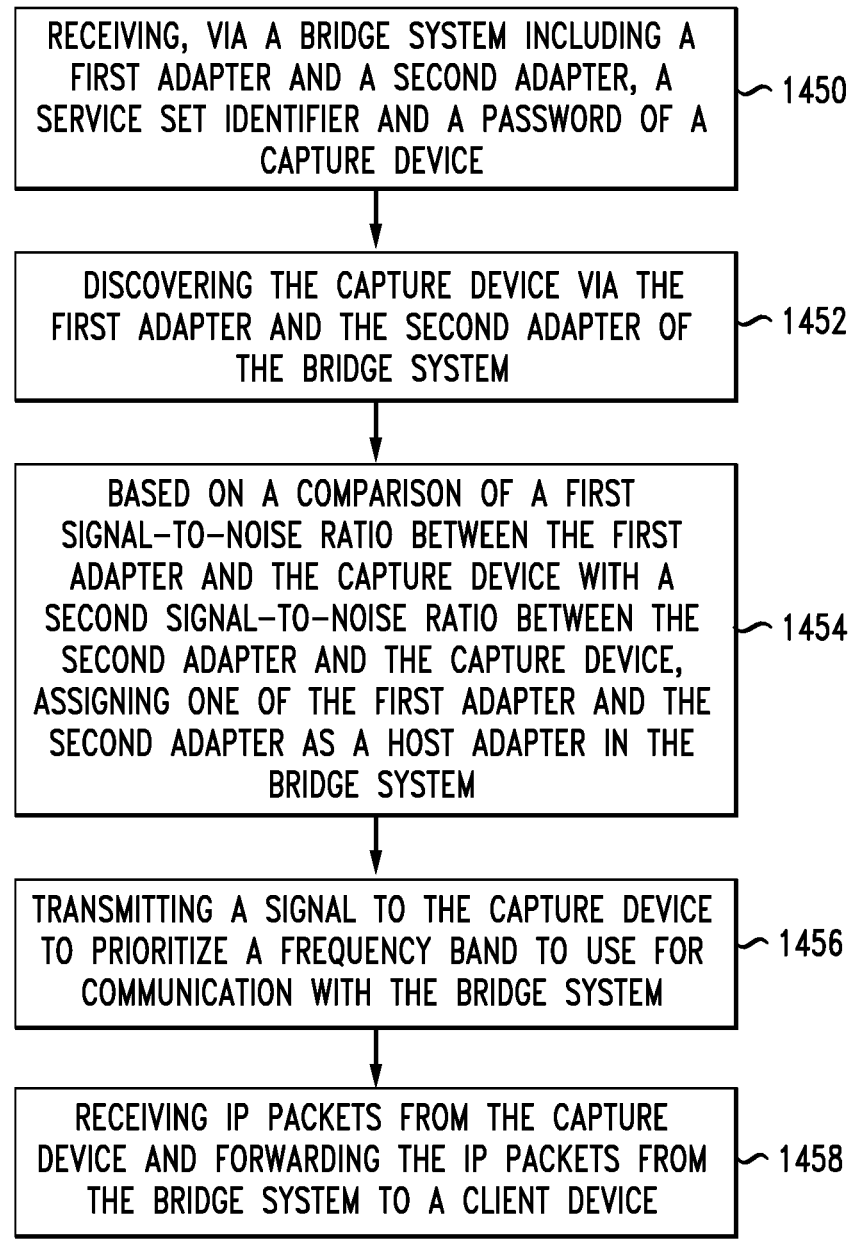
FIG. 14 illustrates another method aspect.

FIG. 14 illustrates another method embodiment. The method includes receiving, via a bridge system including a first adapter and a second adapter, a service set identifier and a password of a capture device (1450), discovering the capture device via the first adapter and the second adapter of the bridge system (1452), and based on a comparison of a first signal-to-noise ratio between the first adapter and the capture device with a second signal-to-noise ratio between the second adapter and the capture device, assigning one of the first adapter and the second adapter as a host adapter in the bridge system (1454). In one example, the adapter with the strongest signal-to-noise ratio is assigned the host adapter in which the host adapter is configured to communicate wirelessly with the capture device 1302. The assigning step can occur after the capture device is placed within water. Other protocols, other than utilizing a signal-to-noise ratio, could be utilized to assign the client adapter and the host adapter within the bridge system. For example, timing elements of communication with the capture device 1302, depth or elevation readings or comparisons might be utilized. Pressure readings could also be utilized to determine that the adapter 1304 as well as the capture device 1302 are both underwater, thus causing the bridge system 1308 to assign the adapter 1304 is the host adapter. Any mechanism could be utilized to gather data which could be useful in assigning one of the adapters of the bridge system 1308 to be the host adapter which is generally determined to be closer to the capture device 1302 physically.

The method can also include transmitting a signal to the capture device to prioritize a frequency band to use for communication with the bridge system (1456) and receiving IP packets from the capture device and forwarding the IP packets from the bridge system to a client device (1458). The signal could be transmitted to the capture device from the host adapter or the client adapter or any other component. The host adapter will typically receive the IP packets from the capture device via a wireless protocol, such as WiFi. The host adapter will communicate the packets via a wired tether to the client adapter which will then transmit the IP packets via a wireless protocol, such as WiFi, to the client's device.

Examples within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Exemplary systems or methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices. The method can include any one or more of the claim steps in combination. For example, the assignment of the frequency band is not necessary in a broadest interpretation.

The various examples described above are provided by way of illustration only and should not be construed to limit the scope of the disclosure. For example, the principles herein can also apply to cover an application that can be downloaded on device 114 for controlling the system 102 or any components disclosed herein. Thus, an aspect of this disclosure is a device that receives information and transmits information to an underwater wireless module 108 using the various components disclosed herein. One of many other configurations could be to apply this technology on trolling motors commonly used on bass boats. This would give the user hands free and wire free ways to see where they are pointing with their trolling motor. Various modifications and changes may be made to the principles described herein without following the example systems and applications illustrated and described herein, and without departing from the spirit and scope of the disclosure. Claim language reciting "at least one of" a set indicates that one member of the set or multiple members of the set satisfy the claim. Finally, it is noted that any step, structure, component, device, or any individual operation disclosed herein can be mixed and matched with any other step, component, device, or operation disclosed herein whether or not it is part of the same embodiment, example or discussion.

We claim:
1. A method comprising:
receiving, via a bridge system comprising a first adapter and a second adapter, a service set identifier and a password of a capture device;
discovering the capture device via the first adapter and the second adapter of the bridge system;
based on a comparison of a first signal-to-noise ratio between the first adapter and the capture device with a second signal-to-noise ratio between the second adapter and the capture device, assigning one of the first adapter and the second adapter as a host adapter in the bridge system to communicate with the capture device; and
forwarding IP packets received from the capture device, via the bridge system, to a client device, wherein the bridge system rewrites MAC addresses associated with the client device and the capture device in XID tables prior to receiving the IP packets from the capture device at the host adapter and forwarding the IP packets from the bridge system to the client device.

2. The method of claim 1, wherein the client device communicates wirelessly with a client adapter of the bridge system, wherein the client adapter comprises one of the first adapter and the second adapter that is not assigned as the host adapter.

3. The method of claim 1, wherein the first adapter and the second adapter communicate via a wired tether.

4. The method of claim 1, further comprising:
transmitting, from the host adapter, a signal to the capture device to prioritize a frequency band to use for communication with the bridge system; and
receiving, via the frequency band, the IP packets from the capture device at the host adapter.

5. The method of claim 4, wherein the frequency band comprises a 2.4 GHz band.

6. The method of claim 1, wherein the host adapter comprises the first adapter or the second adapter having a highest signal-to-noise ratio with the capture device.

7. The method of claim 4, wherein the signal to the capture device to prioritize the frequency band to use for communication with the bridge system causes the capture device to prioritize a lowest frequency band available as a chosen frequency band for data communication.

8. The method of claim 7, wherein the chosen frequency band comprises a 5 GHz frequency band.

9. The method of claim 1, wherein the assigning of one of the first adapter and the second adapter as the host adapter in the bridge system to communicate with the capture device occurs after the capture device is placed within water.

10. A bridge system for bridging indication of data between a client device and a capture device, the bridge system comprising:
a first adapter; and
a second adapter indicating with the first adapter via a wired tether, wherein during a calibration process, at least one of the first adapter and the second adapter perform operations comprising:
discovering, by both the first adapter and the second adapter, the capture device;
based on a comparison of a first signal-to-noise ratio between the first adapter and the capture device with a second signal-to-noise ratio between the second adapter and the capture device, assigning one of the first adapter and the second adapter as a host adapter in the bridge system to communicate with the capture device; and
forwarding IP packets received from the capture device, via the bridge system, to a client device, wherein the bridge system rewrites MAC addresses associated with the client device and the capture device in XID tables prior to receiving the IP packets from the capture device at the host adapter and forwarding the IP packets from the bridge system to the client device.

11. The bridge system of claim 10, wherein the client device communicates wirelessly with a client adapter of the bridge system, wherein the client adapter comprises one of the first adapter and the second adapter that is not assigned as the host adapter.

12. The bridge system of claim 10, wherein the first adapter and the second adapter communicate via a wired tether.

13. The bridge system of claim 10, further comprising:
transmitting, from the host adapter, a signal to the capture device to prioritize a frequency band to use for communication with the bridge system; and
receiving, via the frequency band, the IP packets from the capture device at the host adapter.

14. The bridge system of claim 13, wherein the frequency band comprises a 2.4 GHz band.

15. The bridge system of claim 10, wherein the host adapter comprises the first adapter or the second adapter having a highest signal-to-noise ratio with the capture device.

16. The bridge system of claim 13, wherein the signal to the capture device to prioritize the frequency band to use for communication with the bridge system causes the capture device to prioritize a lowest frequency band available as a chosen frequency band for data communication.

17. The bridge system of claim 16, wherein the chosen frequency band comprises a 5 GHz frequency band.

18. The bridge system of claim 10, wherein the assigning of one of the first adapter and the second adapter as the host adapter in the bridge system to communicate with the capture device occurs after the capture device is placed within water.

* * * * *